(12) United States Patent
Zhao et al.

(10) Patent No.: US 8,521,630 B2
(45) Date of Patent: Aug. 27, 2013

(54) CURVE ENGINE

(71) Applicant: IntercontinentalExchange, Inc., Atlanta, GA (US)

(72) Inventors: Zhenyuan Zhao, Atlanta, GA (US); Jiaxi Xiao, Marietta, GA (US); Yunke Yang, Atlanta, GA (US); Stephen Pounds, Marietta, GA (US)

(73) Assignee: IntercontinentalExchange, Inc., Atlanta, GA (US)

( * ) Notice: Subject to any disclaimer, the term of this patent is extended or adjusted under 35 U.S.C. 154(b) by 0 days.

(21) Appl. No.: 13/633,692

(22) Filed: Oct. 2, 2012

(65) Prior Publication Data

US 2013/0054439 A1 Feb. 28, 2013

Related U.S. Application Data

(60) Provisional application No. 61/542,844, filed on Oct. 4, 2011.

(51) Int. Cl.
*G06Q 40/00* (2012.01)

(52) U.S. Cl.
USPC ............................ 705/35; 705/36 R; 705/37

(58) Field of Classification Search
USPC .................................................. 705/35, 36 R
See application file for complete search history.

(56) References Cited

U.S. PATENT DOCUMENTS

2012/0226645 A1 * 9/2012 O'Rourke ...................... 706/46

* cited by examiner

*Primary Examiner* — James A Vezeris
(74) *Attorney, Agent, or Firm* — DLA Piper LLP (US)

(57) ABSTRACT

Systems and methods for pricing financial instruments include constructing, via at least one computing device comprising one or more processors executing computer-executable instructions stored in memory, a virtual financial complex network comprising one or more interrelated financial markets. Market color data related to at least one of the financial markets is then blended with price data to determine blended pricing information. This blended pricing information is then used to define an objective function that when solved, via an optimization model, determines a minimum market price for each financial instrument across the one or more financial markets.

30 Claims, 23 Drawing Sheets

CURVE ENGINE

CROSS REFERENCE TO RELATED APPLICATION

This Application claims priority to U.S. Provisional Patent Application No. 61/542,844 filed Oct. 4, 2011, the contents of which are incorporated herein in its entirety.

TECHNICAL FIELD

The present disclosure relates generally to pricing financial instruments in a given financial complex network.

BACKGROUND

Financial instruments are typically priced according to a pricing model that considers each market microstructure independently. That is to say, groups of financial instruments are typically priced according to their respective microstructure groupings, with no regard for other instruments in other microstructures. While pricing in this manner may be reflective of each individual microstructure, it does not account for the effect that financial instruments in one microstructure may have on the prices of instruments belonging to other microstructures, and vice versa. Further, this pricing model does not (and cannot) account for interdependencies (between financial instruments) existing in the greater economic macrostructure.

Accordingly, there is a need for a system, method and apparatus that provides both a global and local pricing framework for pricing financial instruments in a manner that considers both inter- and intra-market interdependencies and relationships of financial instruments across market micro structures.

SUMMARY

Systems and methods for pricing financial instruments in accordance with this disclosure include constructing, via at least one computing device comprising one or more processors executing computer-executable instructions stored in memory, a virtual financial complex network comprising one or more interrelated financial markets. Market color data related to at least one of the financial markets is then blended with price data to determine blended pricing information. This blended pricing information is then used to define an objective function that when solved, via an optimization model, determines a minimum market price for each financial instrument across the one or more financial markets.

BRIEF DESCRIPTION OF THE DRAWINGS

The foregoing summary and the following detailed description are better understood when read in conjunction with the appended drawings. Exemplary embodiments are shown in the drawings, however, it is understood that the embodiments are not limited to the specific methods and instrumentalities depicted herein. In the drawings.

DETAILED DESCRIPTION

Figure 1:
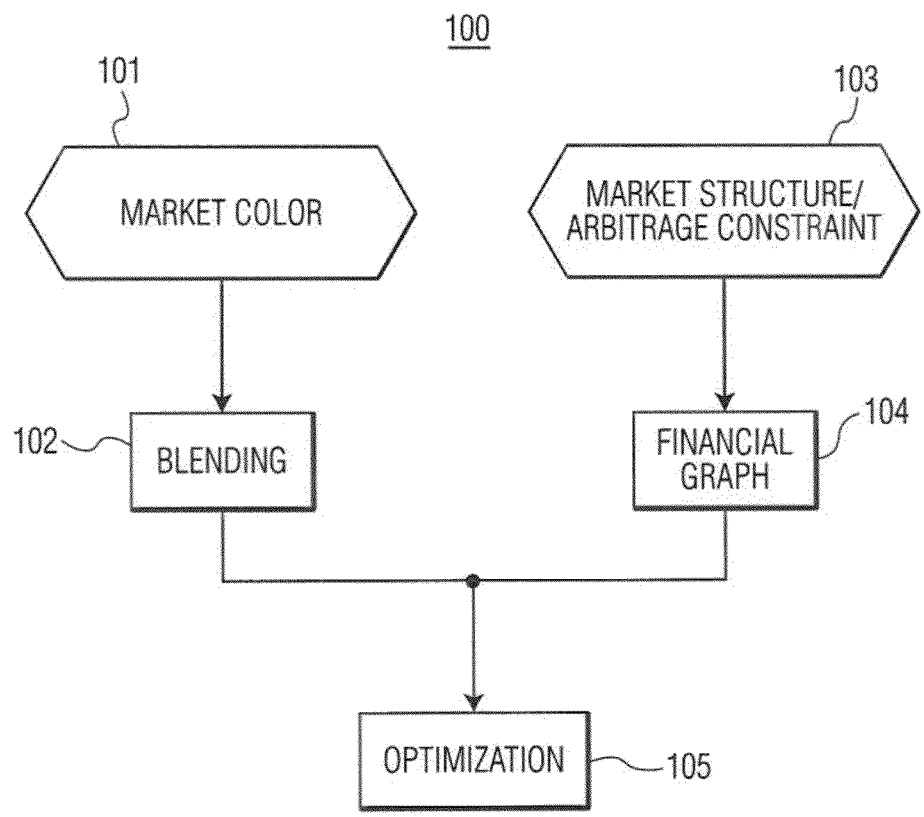
FIG. 1 illustrates an generalized working scheme of an exemplary curve engine in accordance with this disclosure.

The present disclosure relates to methods, systems and apparatus for providing a robust, scalable, fast, and reliable platform and pricing framework capable of pricing both linear and non-linear interdependent financial instruments. While each individual financial instrument has its own unique market microstructure, financial instruments are not themselves devoid of effect on other instruments in a greater economic macrostructure (e.g., instruments in other markets), and vice versa. The methods, systems and apparatus described herein provide both a global and local pricing framework for every financial instrument in a given "complex" (defined below). This is made possible, in part, by accessing and processing various types of data and information from a variety of sources, such as (without limit) execution venue deals and depth-of-market, external settlement prices, third-party data, historical mutually dependent pricing relationships, inter and intra-instrument no-arbitrage constraints, etc.; and then using the such data and information to create a pricing framework that reflects the relationships and interdependencies of the various data types and sources. For purposes of this disclosure, the systems, methods and/or apparatus configured to provide such a novel pricing framework may collectively be referred to as a "curve engine," "curve engine technology," "curve engine system," or simply "CE" for short.

To better understand the features described herein, the following terms shall have the meanings prescribed below:

"financial instrument(s)" or "product(s)" are utilized interchangeably throughout this disclosure (in a non-limiting manner) to refer a tradable asset of any kind, including cash; evidence of an ownership interest in an entity; or a contractual right to receive, or deliver, cash or another financial instrument. Examples of products and financial instruments include, without limit, securities, stocks, stock options, loans, commercial paper, bonds, derivative instruments (e.g., forwards, futures, options, swaps, etc.), etc.

"complex" or "financial complex network" or "financial network" refers to a collection of financial markets together with any and all associations or relations between and amongst the financial markets;

"market color" refers generally to all data and information relating to a particular financial market, including (without limit) data and/or information relating to bids, offers, deals, orders, historic settlement prices, current market configurations, active market lists, suggested settlement prices (e.g., from third party or broker dealer systems), execution venue deals, depth of market, external settlement prices, third-party data, historical mutually dependent pricing relationships, inter and intra-instrument no-arbitrage constraints, etc.

As further discussed below, the curve engine technology described herein is preferably configured to utilize, implement, and/or solve the following: 1) a high frequency financial data compression model, 2) a mathematical translation and solution of the financial exchange/clearinghouse settlement pricing business problem as a network topological manifold minimization problem, and 3) an option implied volatility surface dynamics model. Notably, such curve engine technology may be implemented as an independent or stand-alone device (e.g., a computer or server) or system that may be connected to a trading system such as, for example, an electronic financial exchange system. Alternatively, the curve engine technology may be implemented or incorporated into an existing financial trading system (e.g., an electronic financial exchange system), for example, as one or more software modules embodied in a computer. The curve engine may additionally or alternatively be connected to a web-based user interface, by which operators can connect into and use the CE system. The remainder of this disclosure outlines the details of the curve engine technology by providing insight into the formulation, methodology, and design thereof.

In one aspect, the curve engine technology may be configured to provide a scalable framework for pricing financial instruments such as (without limit) futures contracts, over-the-counter (OTC) instruments, options contracts, etc. This framework is preferably configured to accommodate various types of financial markets, as well as to reflect the financial markets in various liquidity states. Optionally, the curve engine technology may be configurable, which allows for optimal effectiveness and utilization under various implementations. Such configuration may occur, for example, via user input, pre-programming and/or configuration files that contain product-specific configuration parameters, which makes the introduction of new products highly feasible and convenient. The curve engine technology may also be configured to switch between pricing algorithms based, for example, on the configuration parameters. External interfaces may be used to access the curve engine technology to modify the configuration parameters, certain aspects or options within the CE system, such as (without limit) settlement products, external data sources, algorithm parameters, etc.

In another aspect, the curve engine technology described herein may be configured to utilize historical (pricing) data and information to generate a current day's settlement pricing, which keeps the settlement prices relatively stable and facilitates day-over-day changes.

In yet another aspect, the CE technology may be configured to accommodate and utilize various forms of data and information from various markets, such as (without limit) deal and order information from various markets, to generate a robust pricing framework. As further discussed below, this data and information may be combined or "blended" (discussed further below) with historical data to generate such a pricing framework.

The CE technology may also be configured to receive and/or utilize market color data and information (defined below), which may be provided via a weighting system, for example. As detailed below, market color data includes various types of market information (e.g., deals, two-way quotes, one-way quotes) and market timestamps to determine an optimal a pricing framework.

In order to account for possible changes (e.g., pricing changes) in the various data sources feeding the CE system, the CE technology may be configured to apply techniques such as (without limit) a strike space transformation technique, which provides multiple ways to account for underlying reference changes relating to the various data sources.

in another aspect, the CE technology may further be configured to implement an optimization procedure that eliminates static arbitrage for financial instruments (e.g., futures, OTC contracts, options, etc.) by introducing a minimum impact to blended option price curves, which hastens the processing speed of large complexes (including those involving thousands of financial markets). The CE technology may also be configured to automatically generate plots for further analysis.

In a general sense, the CE technology described herein serves as a processor which takes into account market color data and other pertinent data and information, and creates a pricing framework that outputs 'intelligent' prices for each financial market of a financial complex network.

As indicated above, financial instrument prices are not necessarily independent, even when the instruments are in different financial markets. In other words, the price of one financial instrument in one financial market may have an effect on the price of another. It then follows that other aspects of financial markets may also be (to some extent) interrelated. Thus, for example, liquid hubs in one market may drive the prices for illiquid hubs at a hub level, and liquid markets may drive the prices for illiquid markets at a market level.

As a result of such product interdependency, the CE models financial markets collectively as an integrated financial complex network, where each market may be represented as a node or agent and the financial (arbitrage) relations between the markets may be represented as links between and among the nodes (markets). Modeling financial complex networks in this manner provides a visual topological structure representation of the financial markets, as well as an indication of the information flow and the dynamic relationships between the markets. As a result, price changes in one market may be assessed to determine their impact on other markets within the network.

As with any network, the complex network concept described herein is on-stationary, adaptive, and evolutionary. As a result, the present disclosure provides a unique modeling approach that facilitates constructing, updating and solving the complex network using mathematical representation(s) to end up with a robust pricing framework.

From a mathematical perspective, the problem of solving a financial complex network to determine a robust pricing framework may be categorized as an optimization problem, where an objective function may be defined with one or several constraints, and where the output is an optimal solution to the objective function. In one aspect, the CE technology may be configured to both form such an optimization problem through the modeling of a financial complex network, and provide an optimized result thereto.

Turning now to FIG. 1, an exemplary generalized working scheme (100) of a CE in accordance with is disclosure is illustrated. As shown, market color (101) is blended (102) and market structure/arbitrage constraints are used to create financial graphs (104). Collectively, the blended market color (102) and financial graph (104) information are fed into an optimization model (105) to create a pricing framework.

Mathematical Optimization

By way of background, the following provides a very brief introduction to the concept of mathematical optimization, which only covers the basic concept of an optimization problem and provides some common language for the math.

A mathematical optimization problem has the form:

$$\text{minimize } f_0(x)$$

$$\text{subject to } f_i(x) \leq b_i, i=1\ldots,m. \quad (1)$$

Here, the vector $x=(x_1,\ldots,x_n)$ is the optimization variable of the problem, the function $f_0: R^n \to R$ is the objective function, the functions $f_i: R^n \to R$, $i=1,\ldots m$, are the (inequality) constraint functions, and the constants $b_1,\ldots b_m$ are the limits, or bounds, for the constraints. A vector $x^*$ is called optimal, or a solution to optimization equations (22) or (25) below, if it has the smallest objective value among all vectors that satisfy the constraints (called "search space", further discussed below): for any z with $f_1(z) \leq b_1, \ldots, f_m(z) \leq b_m, f_0(z) \geq f_0(x^*)$.

Families or classes of optimization problems may be characterized by particular forms of the objective and constraint functions. As an example, the optimization problems expressed via equations (22) and (25) below may be referred to as a linear program (LP) if the objective and constraint functions $f_0, \ldots, f_m$ are linear, i.e., satisfy the equation:

$$f_i(\alpha x + \beta y) = \alpha f_i(x) + \beta f_i(y), \quad (2)$$

for all $x, y \in R^n$ and all $\alpha, \beta \in R$. If the optimization problem is not linear, it is called a nonlinear program.

Another class of optimization problems are referred to as convex optimization problems, in which the objective and constraint functions are convex, which means they satisfy the inequality:

$$f_i(\alpha x + \beta y) \leq \alpha f_i(x) + \beta f_i(y). \quad (3)$$

for all $x, y \in R^n$ and all $\alpha, \beta \in R$, with $\alpha+\beta=1$, $\alpha \geq 0$, $\beta \geq 0$. Comparing equations (2) and (3) above, it is evident that the convex optimization is a generalization of linear programming. Notably, some convex optimization problems, in particular Quadratic Programming (QP) and variants of QP, can be essentially converted into sets of linear equations, which can be solved by standard linear solvers.

A Financial Network Model

As indicated above, the CE described herein may be configured to treat collections of financial markets as complexes (i.e., networks) that are grouped by market structure and/or arbitrage conditions among the markets. Such markets (within a given network) may be connected or linked to build up and form a financial complex network, which includes "package relations" and "spread relations" (discussed below) for certain financial instruments (e.g. futures and OTC contracts) and "financial arbitrage constraints" (discussed below) for certain other financial instruments (e.g., options contracts). All the network relations, if applicable, may be converted into linear relations:

$$A \times x = 0 \quad (4)$$

where A is a coefficient matrix of size m×n, x is a vector of unknowns (markets' prices) of size 1×n, and in is the number of equations. Otherwise, the network relations may be presented as unequal relations, $A \times x \leq 0$.

Package Relations.

Due to their nature, certain financial instruments (e.g., futures, forwards, OTC contracts, etc.) exhibit certain package relations. This concept of package relations may be better understood by way of example. Suppose that a first Quarter futures contract for the year 2012 exists. This contract may be represented as a data structure called "$Q1_{12}$." Components (i.e., 'children') of this $Q1_{12}$ data structure may include January, February, and March of 2012 ($Jan_{12}$, $Feb_{12}$, $Mar_{12}$). Mathematically, $Q_1 12$ may be set to equal a weighted average (WA) of ($Jan_{12}$, $Feb_{12}$, and $Mar_{12}$). Following this convention, the futures contract $Q1_{12}$ may be presented mathematically as follows: $Q1_{12}=(Jan_{12}+Feb_{12}+Mar_{12})\div 3$. For other financial instruments such as OTC contracts, for example, a $Q1_{12}$ OTC contract may mathematically be represented as a weighted average of the $Q1_{12}$ components, where the components may be weighted with a number of blocks (i.e., number of days in delivery period). In that case, the $Q1_{12}$ OTC contract may be represented as $Q1_{12}*91=Jan_{12}*31+Feb_{12}*29+Mar_{12}*31$. Thus, for a given financial instrument, a package relation represents the relationship between the financial instrument and its components.

Spread Relations.

Figure 2:
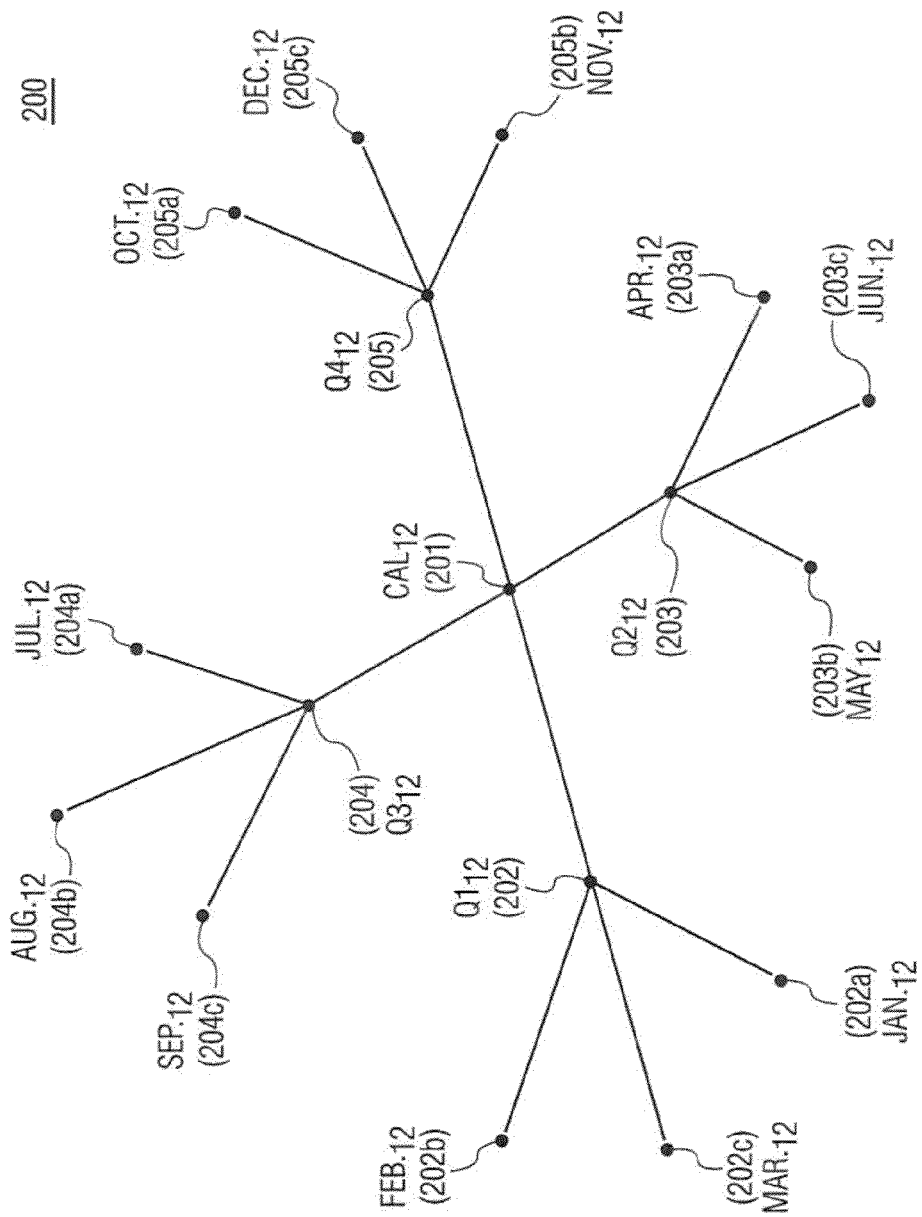
FIG. 2 illustrates an exemplary calendar tree in accordance with this disclosure.

Turning now to FIG. 2, an exemplary calendar tree (200) with month (202a-c-205a-c), quarter (202-205), and year (201) markets is shown. As shown in FIG. 2, this calendar tree (200) has 17 nodes in total (i.e., one calendar 2012 node, four quarter nodes ($Q1_{12}$-$Q4_{12}$), and twelve monthly nodes (January-December)). Links between the various nodes (201-205) represent composition relations. For example, the center node (201) represents the calendar year 2012, and each of the $Q1_{12}$ (202), $Q2_{12}$ (203), $Q3_{12}$ (204) and $Q4_{12}$ (205) nodes represent the four quarters of 2012. Since each quarter has a composition relation to the center node (201), each is shown linked to the center node (201). Similarly, each quarter node (202-205) is linked to its respective monthly nodes (202a-c-205a-c). From this, the calendar year 2012 markets may be represented mathematically in any number of ways, including as an aggregate of four quarters, an aggregate of twelve months, or any combination thereof.

By way of example, and for illustrative purposes only, it is assumed that only the quarter nodes (202-205) will be considered in constructing the composition relationship of the 2012 calendar markets (200). It is also assumed that the financial instruments being modeled are futures contracts, although it should be understood that this disclosure applies to any and all types of financial instruments.

Based on the relationships (i.e., links) depicted in FIG. 2, five separate equations may be constructed representing the composition relationships of the 2012 calendar year markets (200):

$$Cal*3=Q1+Q2+Q3+Q4;$$

$$Q1=Jan+Feb+Mar;$$

$$Q2 = \text{Apr} + \text{May} + \text{Jun};$$

$$Q3 = \text{Jul} + \text{Aug} + \text{Sep};\text{ and}$$

$$Q4 = \text{Oct} + \text{Nov} + \text{Dec}.$$

Collectively, these equations represent the spread relations of the 2012 calendar year markets (200).

Figure 3:
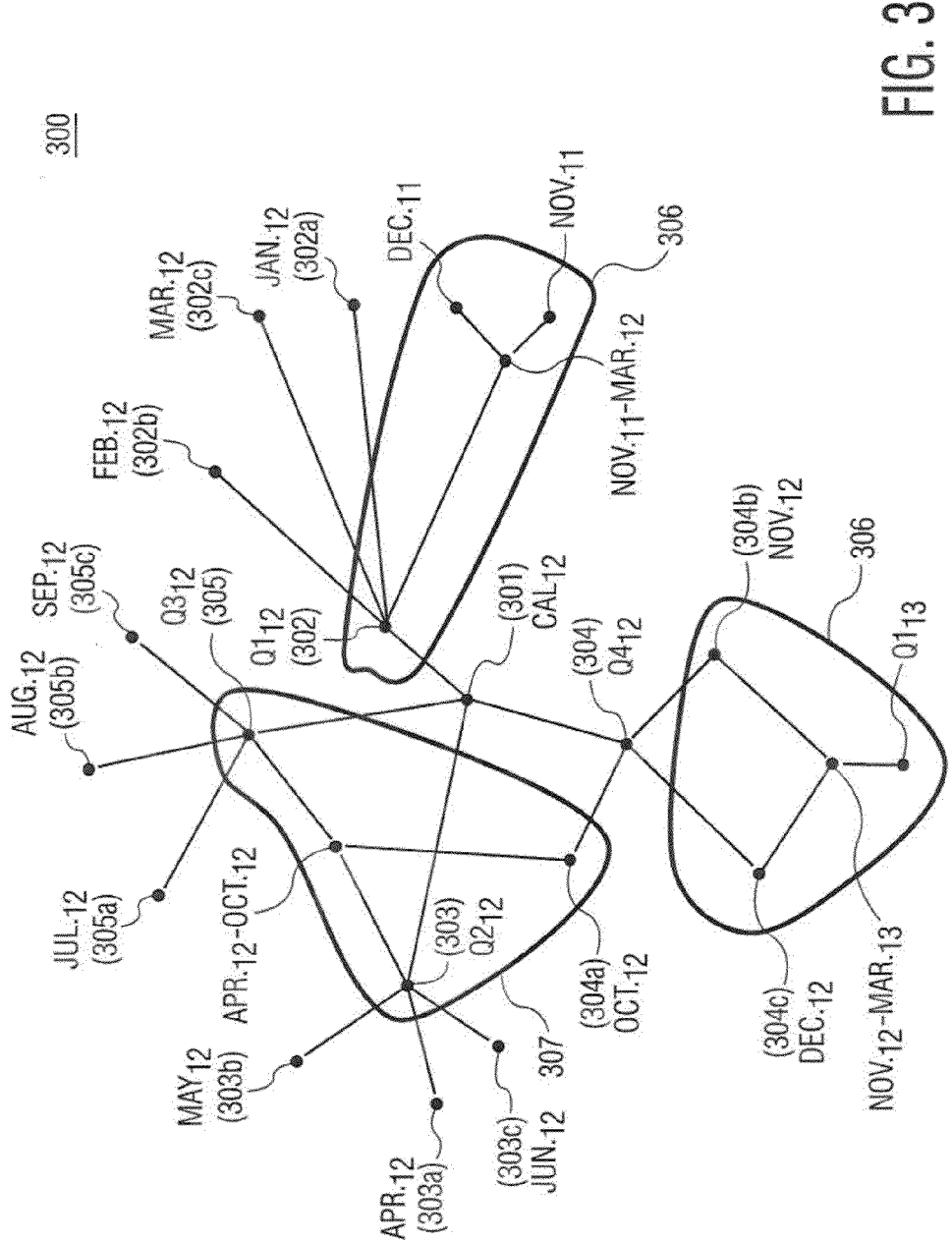
FIG. 3 illustrates an exemplary calendar tree that includes seasonal markets in accordance with this disclosure.

Turning now to FIG. 3, an exemplary calendar tree (300) with month (302*a-c*-305*a-c*), quarter (302-305), and year (301) markets is shown. In addition, this calendar tree (300) represents seasonal markets such as winter (306) and summer (307). By incorporating seasons (306-307), the tree 300 (i.e., the nodes) becomes expanded, particularly since the winter season (306) overlaps with two consecutive years, i.e., it starts in November of one year and ends in March of the following year. As a result, there is an increase in the number of nodes and thus, the number of mathematical equations needed to represent the relationships in the calendar tree (300). As shown in FIG. 3, seasons add three more equations or two more equation types to the equations used to represent exemplary calendar tree (200) of FIG. 2, namely:

$$\text{Winter} = \text{Nov} + \text{Dec} + Q1;\text{ and}$$

$$\text{Summer} = Q2 + Q3 + \text{Oct}.$$

Following this logic, it is apparent that adding seasons (or any other type of market-type parameter) may have the effect of extending a particular network tree in time axis. This is particularly true when the additional market-type parameter extends into multiple calendar trees, as is the case with adding the winter season. This concept is illustrated, for example, in FIG. 4 which shows the progression of a single-year calendar tree (401) that includes only quarter, month, and year markets (similar to the calendar tree (200) in FIG. 2), to one that includes one additional market type (402), such as seasons which increases the total node count to 22 nodes (similar to the tree (300) of FIG. 3), to an extended network (403) that spans multiple years (e.g., 2011 to 2019) and/or includes multiple market-types, which increases the node count to over 400, and ultimately to a network (404) that includes even more market-types and/or additional inter-market relationships such as spread-links (discussed below). As shown, the added parameters increases the node count in the network (404) to well over 6,000 markets.

Figure 4:
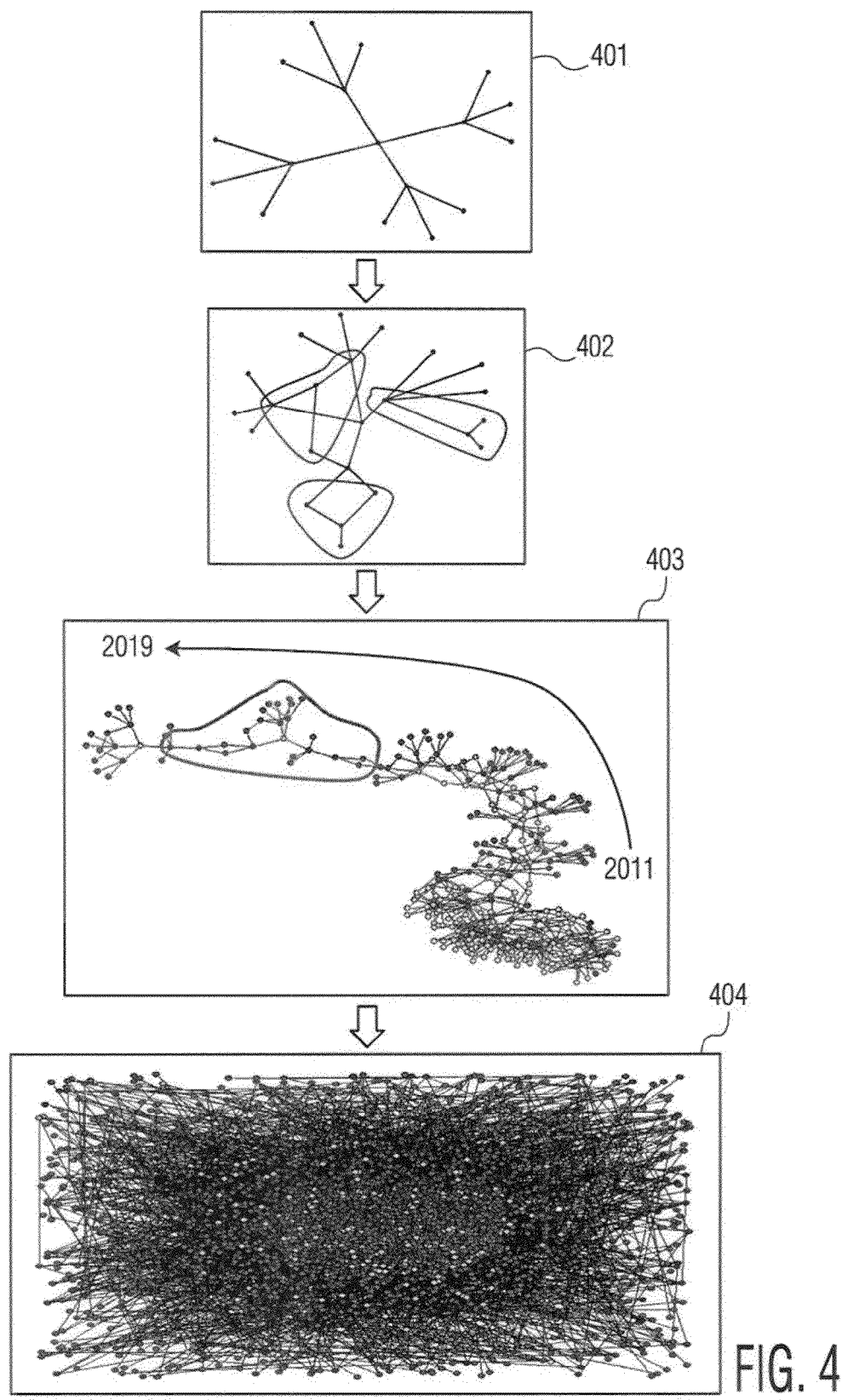
FIG. 4 illustrates the progression of an exemplary financial complex network in accordance with this disclosure.

As is evident from FIG. 4, adding markets, market-type parameters and/or inter-market relationships to a given network exponentially expands the size and complexity of that network. Nonetheless, constructing a network in this manner may be used to fully represent and account for all pertinent markets and/or relationships that may affect the pricing of financial instruments within that network. Since each of these markets and relationships may be represented mathematically, constructing this type of complex network (i.e., a financial complex network) may facilitate defining a mathematical problem whose solution provides an optimal pricing framework for the financial instruments within the complex network. The CE technology described herein defines and solves such a problem.

Spread-Links.

In the context of a given financial trading system, there may be two types of spreads that relate to the legs of a given financial instrument. A regular spread, for example, represents the difference between legs of a financial instrument within the same matching group. An inter-product spread (IPS), on the other hand, represents a spread where the two legs are in different matching groups. Any of these spread types link to both of its legs, and mathematically may be represented as Spr=leg1~leg2, where "Spr" refers to spread.

However, different types of spreads have different impacts on a financial complex network structure. Returning to FIG. 4, for example, extended network (403) only includes regular spread, which according to its market configurations, creates a heterogeneous hub network which is much tighter or heavier linked at the beginning (i.e., 2011) than the end (i.e., 2019). This is due, in part, because historically, market participants focus more on the near future, and statistically, the further into the future, the harder it is to make any prediction. Network (404), however, includes IPS relationships which, as noted above, causes the network to increase exponentially from the node size of 400 to 6000.

Financial Arbitrage Constraints.

Figure 5:
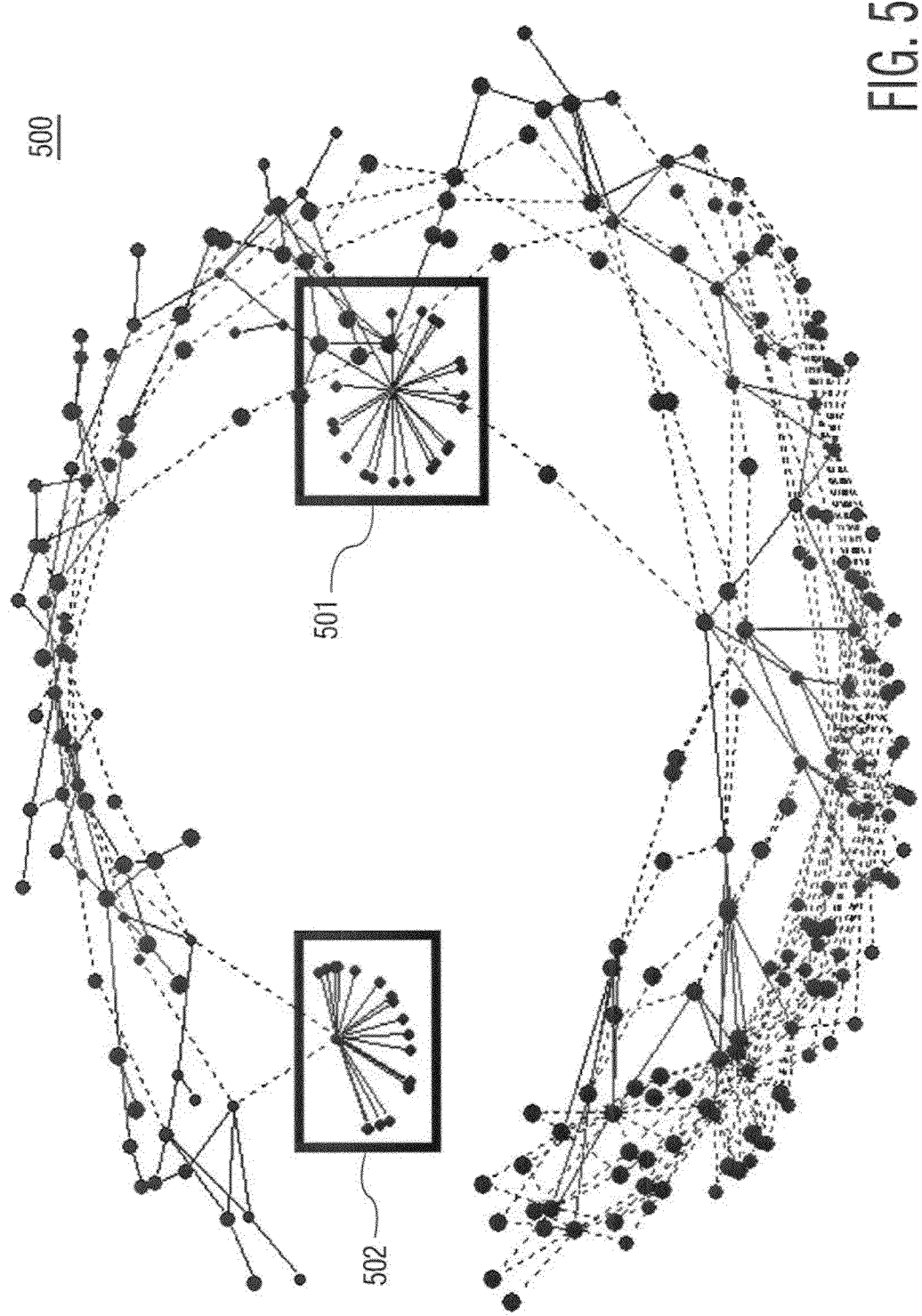
FIG. 5 illustrates an exemplary financial complex network having two synthesized market groups in accordance with this disclosure.

As indicated above, markets with respect to certain financial instruments may be grouped by financial arbitrage constraints (also referred to as "arbitrage conditions") for purposes of constructing a financial complex network. The concept of (static) arbitrage conditions is now discussed with reference to FIG. 5. FIG. 5 illustrates a network (500) having two synthesized market groups (501, 502). For illustration purposes only, this network (500) pertains to options markets grouped into two groups: a monthly market group (501) and an option on a calendar spread (CSO) group (502). As further discussed below, accurately representing options markets may include a "blending" of the various factors that impact such markets. Under this framework, CE is able to price composite options as well as serial options.

The absence of call spread, butterfly spread and calendar spread arbitrage is sufficient to exclude all static arbitrages from a set of option price quotes across strikes and maturities on a single underlier. As a result, a network structure involving options markets may be translated into the following formulas, for each option, market on one underlying:

$$C(k_i) - C(k_{i+1}) \geq 0 \qquad (5)$$

$$C(k_i) - C(k_{i+1}) \geq -e^{-rt}(k_{i+1} - k_i) \qquad (6)$$

$$C''(k_i) > 0 \qquad (7)$$

where C(k) represents a call option price on strike k. It is noted that the first constraint is the monotonic condition for a call, the second constraint is the monotonic condition for a put, and the third constraint is the convexity condition. It then follows that these formulas may be modified to accommodate the calendar spread (for serial options) by adding constraint:

$$C^m(k_i) < e^{t(m+1,m)} C^{m+1}(k_i) \qquad (8)$$

where m refers to maturity, and t(m+1, m) refers to time between maturity m+1 and m.

Single Market Blending

To output accurate prices for every market in a given financial complex network, CE considers at least the following two factors: 1) the financial relationship between markets and 2) the market color of every market. By successfully taking these factors into account, the CE technology is able to generate an accurate pricing framework. Discovering market prices that satisfy all the financial relations within the complex network can be translated mathematically into solving a sequence of linear equations, which is ultimately solved as an optimization problem. It is noted, however, that not all the solutions satisfying the financial constraints are necessarily reasonable.

As indicated above, market color refers data and information relating to financial markets which can affect the reasonableness and/or accuracy of the pricing framework generated by the CE technology. However, accounting for various types of market color is not necessarily straight-forward. Indeed, market color may often include multi-dimensional information, different information types (e.g., deals, bids, and offers), different quantities units, different time stamps, etc. As a result, determining the extent to which the variety of market color is to be considered may be challenging. For example, if market color for a particular market includes information, pertaining to a deal generated at 16:30 pm, and information related to a number of bids generated at 15:30 pm, it is unclear how these different market color data should be considered (relative to one another) within the pricing scheme.

To resolve this issue, the CE technology is configured to implement a weighting process that applies 'weights' to the different market color data and information. In one aspect, this weighting process may comprise a weighting algorithm which implements multi-dimensional blending methods that blend prices for each market according to its market color, taking into account different types of deals and orders, volume and time, and other parameters. In addition, the weighting algorithm may provide weights on the blended prices. By implementing this type of weighting algorithm, the CE technology is able to (among others features) provide a reference price for an optimization process, generate an optimized price that is close to the reference price, and provide flexible bounds for the optimized price. If the optimized price breaks the bound, a penalty may be assessed. The weights provided by such a weighting process provide a quantitative metric which indicates on how much the optimization process should consider or weigh the reference price and the bounds provided by the weighting process. For instance, the "heavier" the weight, the firmer the market supports the reference price/bounds. Also, violations of price/bounds may be higher if heavily weighted.

Figure 6:
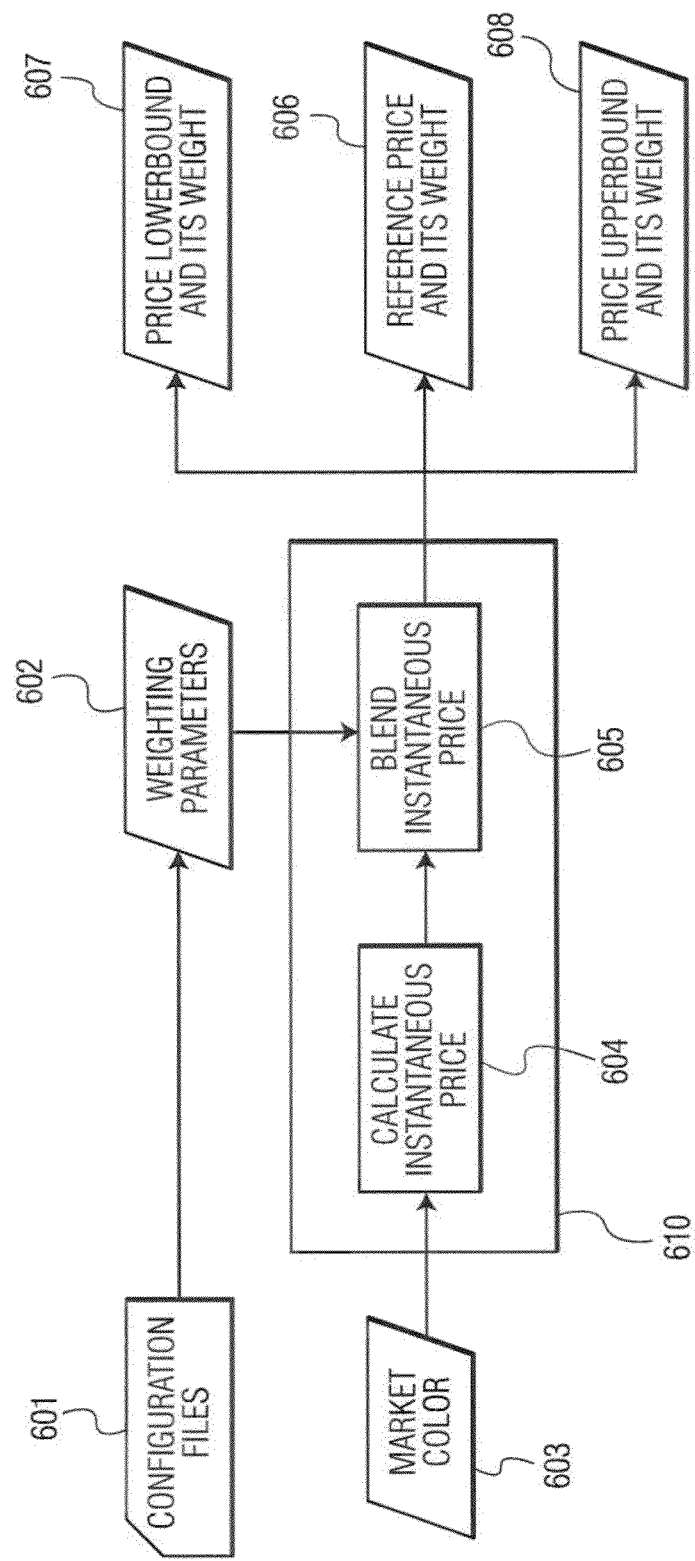
FIG. 6 illustrates an exemplary weighting process in accordance with this disclosure.

Turning now to FIG. 6, a diagram (600) illustrating the structure of an exemplary weighting process according to the present disclosure is shown. As an initial step, weighting parameters (602) may be fed into a weighting algorithm (610). These weighting parameters (602) may be provided from any suitable source, including (for example) from one or more configuration files (601). In addition, market color data (603) may be fed into the weighting algorithm (610). The weighting algorithm (610) then performs two separate operations: 1) calculating an instantaneous price (604) based on the market color data (603), and 2) determining a weighted blending of the instantaneous price (605). Each of these operations are further discussed below.

Figure 7:
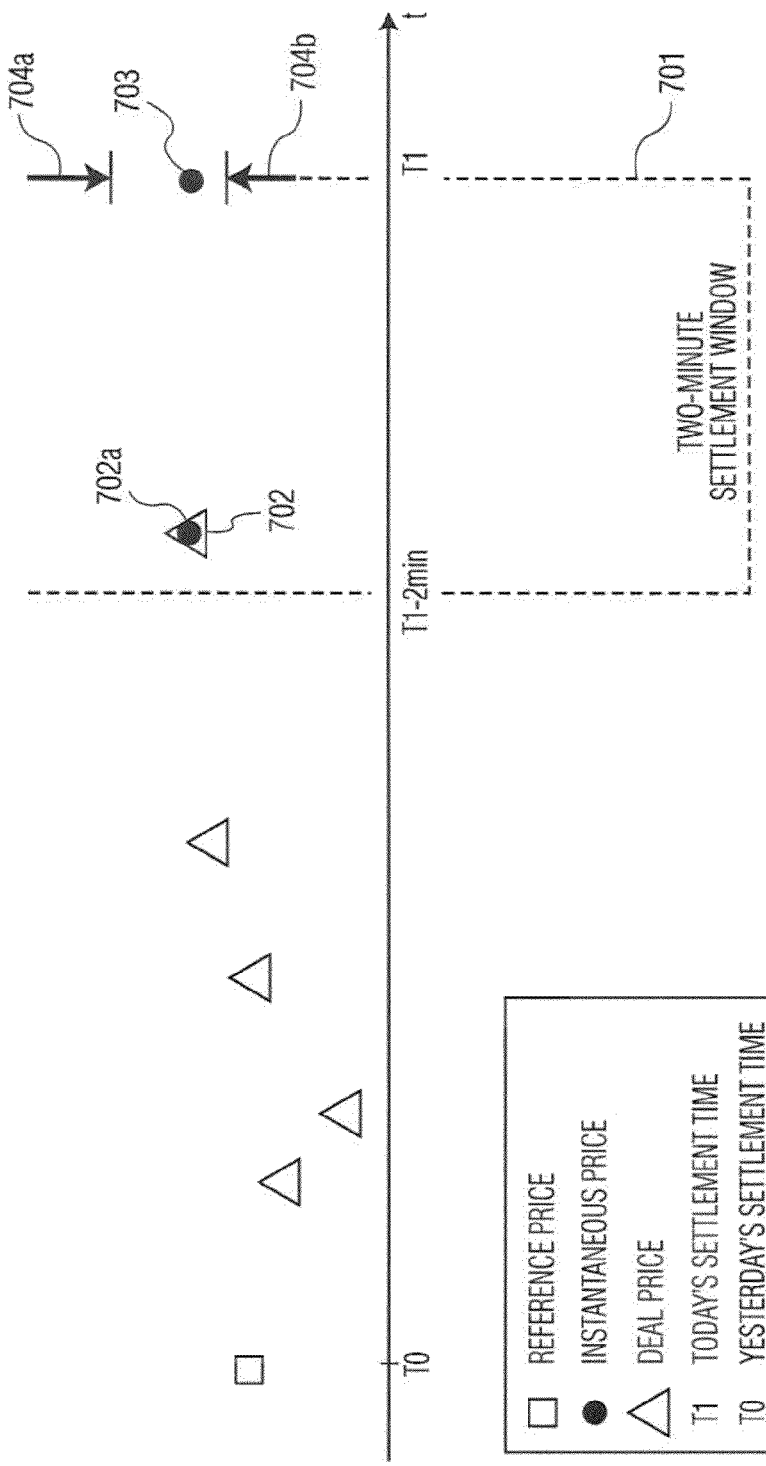
FIG. 7 illustrates an exemplary scenario for which an instantaneous price may be calculated in accordance with this disclosure.
Figure 8A:
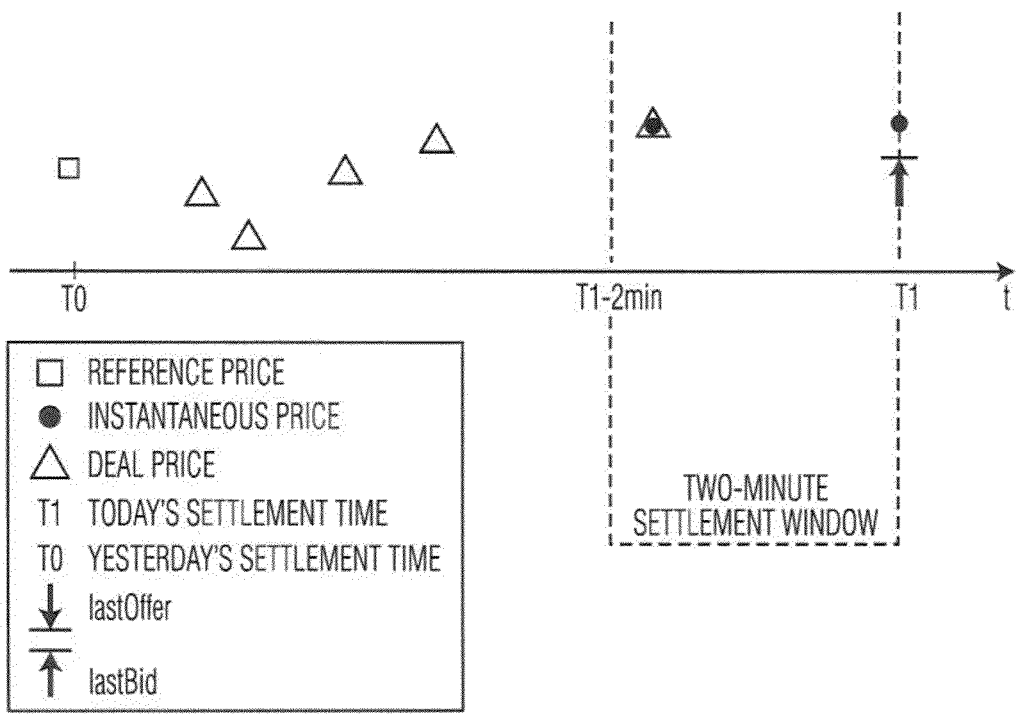
FIG. 8 illustrates additional exemplary scenarios for which an instantaneous price may be calculated in accordance with this disclosure.
Figure 8B:
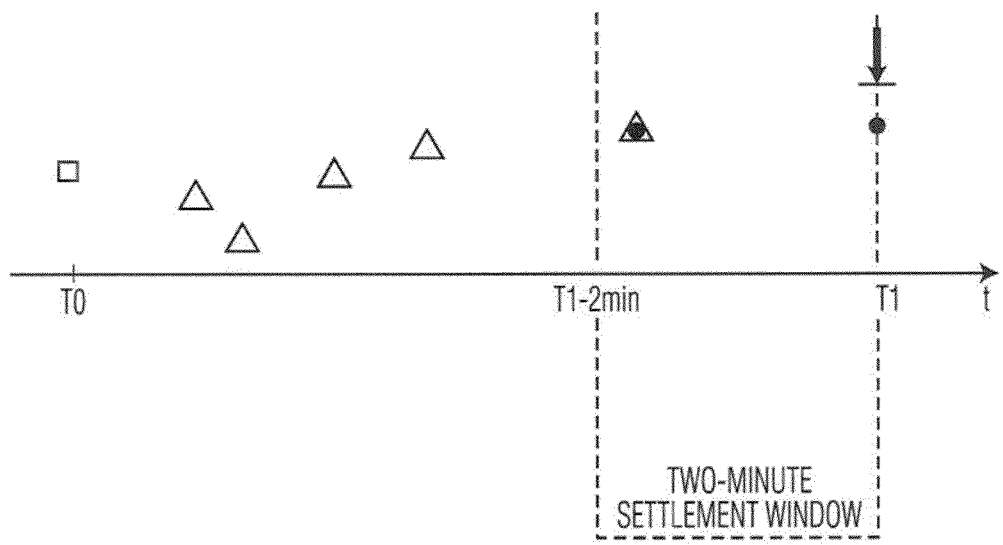
Figure 8C:
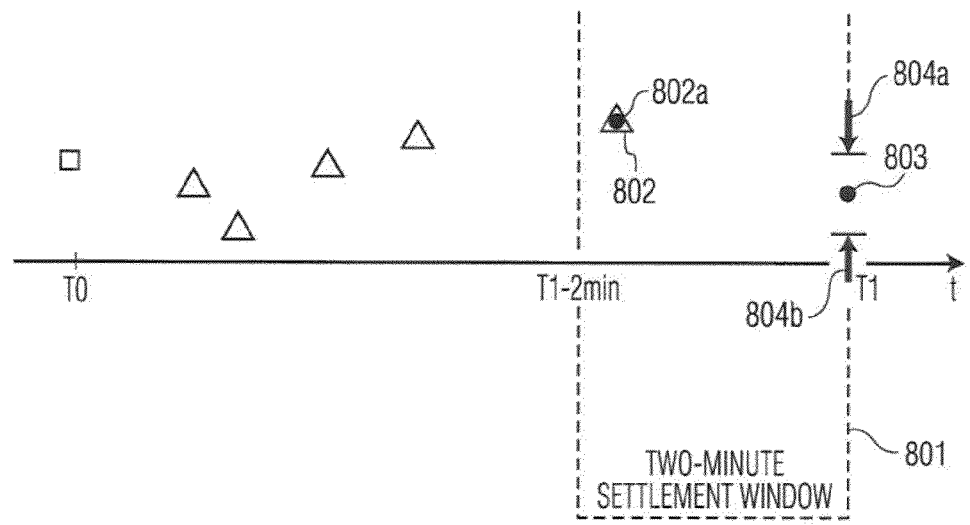
Figure 8D:
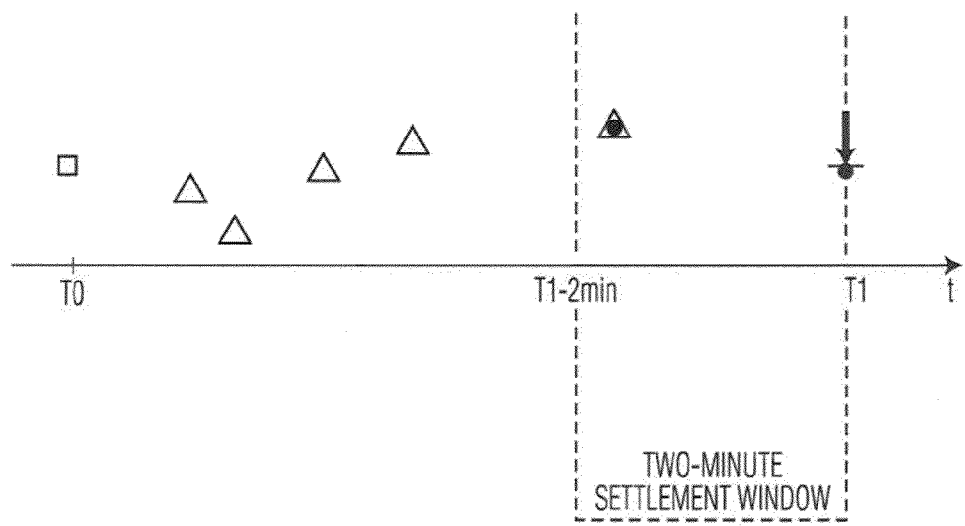
Figure 8E:
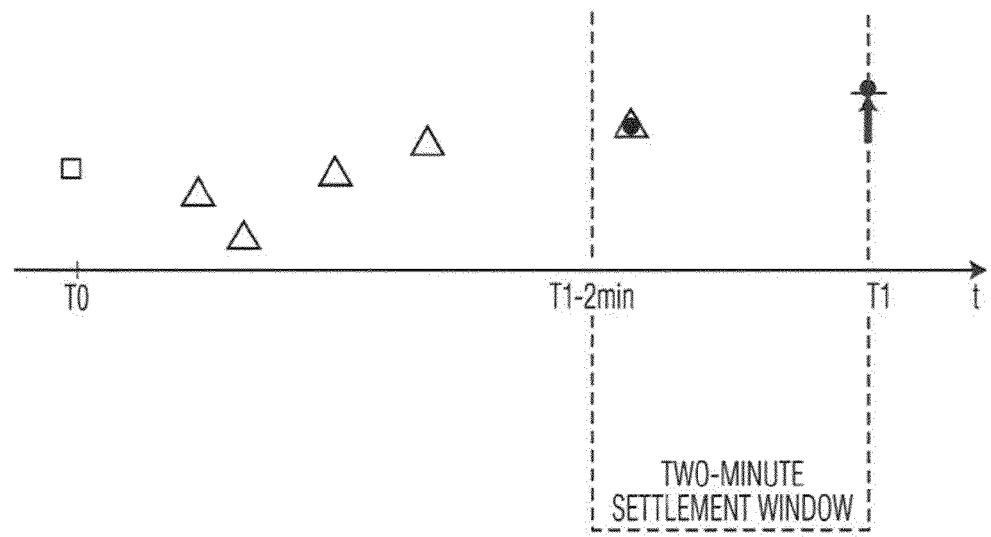
Figure 8F:
Figure 9A:
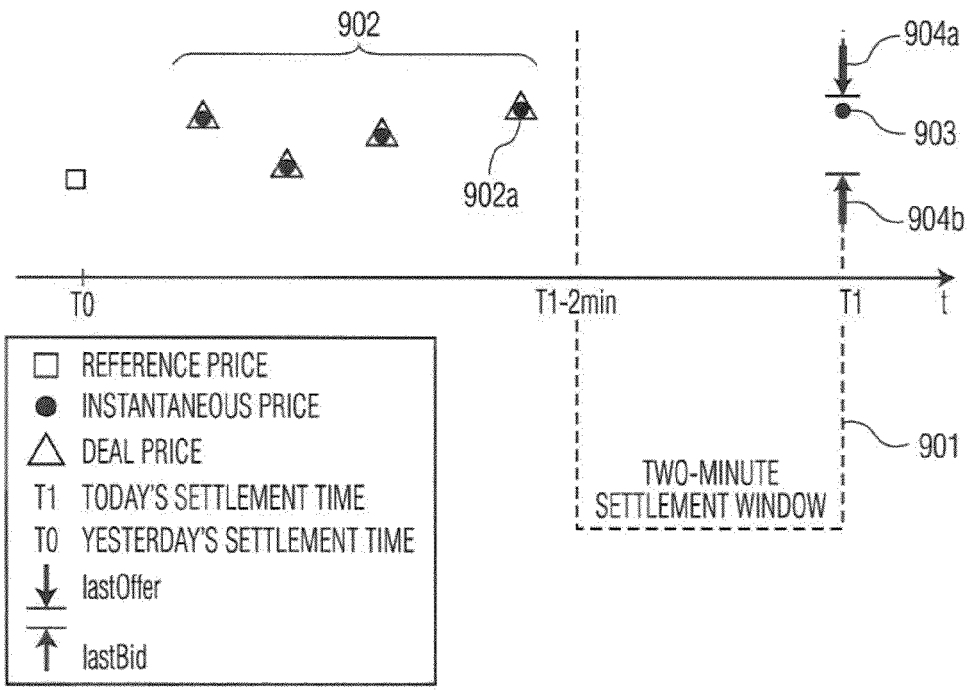
FIG. 9 illustrates still further exemplary scenarios for which an instantaneous price may be calculated in accordance with this disclosure.
Figure 9B:
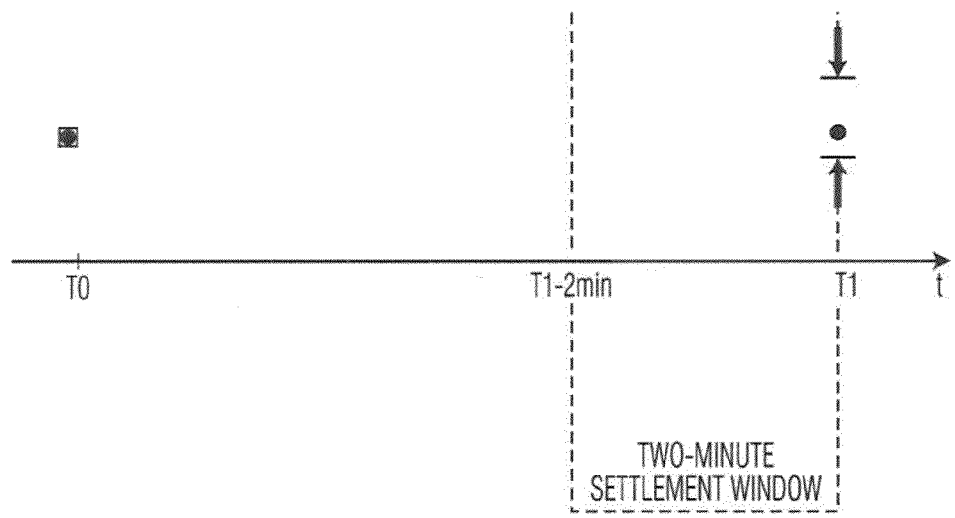
Figure 9C:
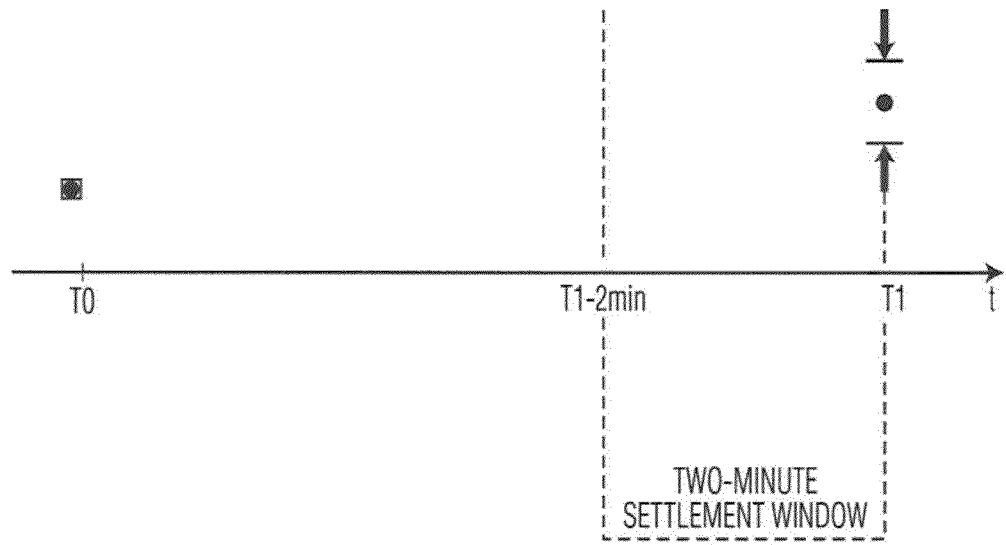
Figure 9D:
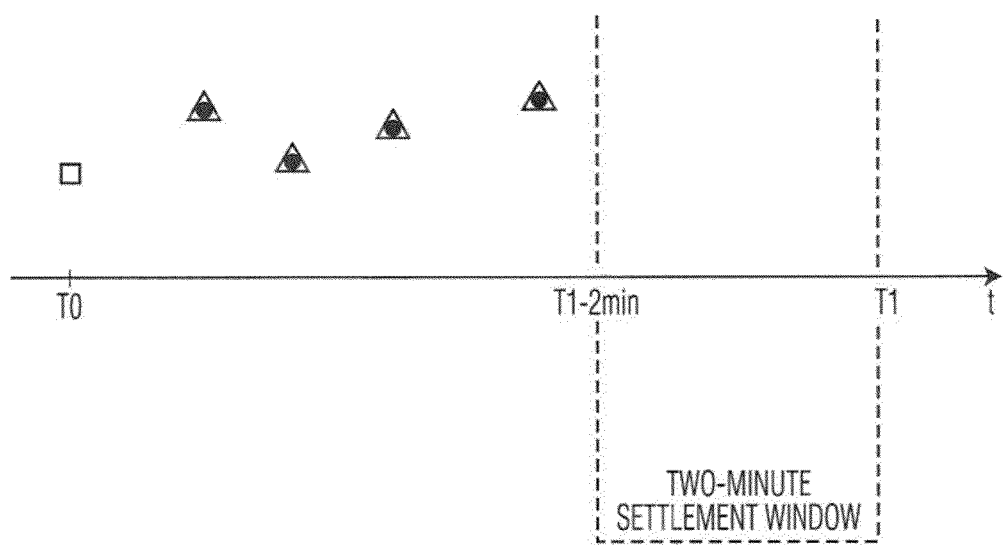
Figure 9E:
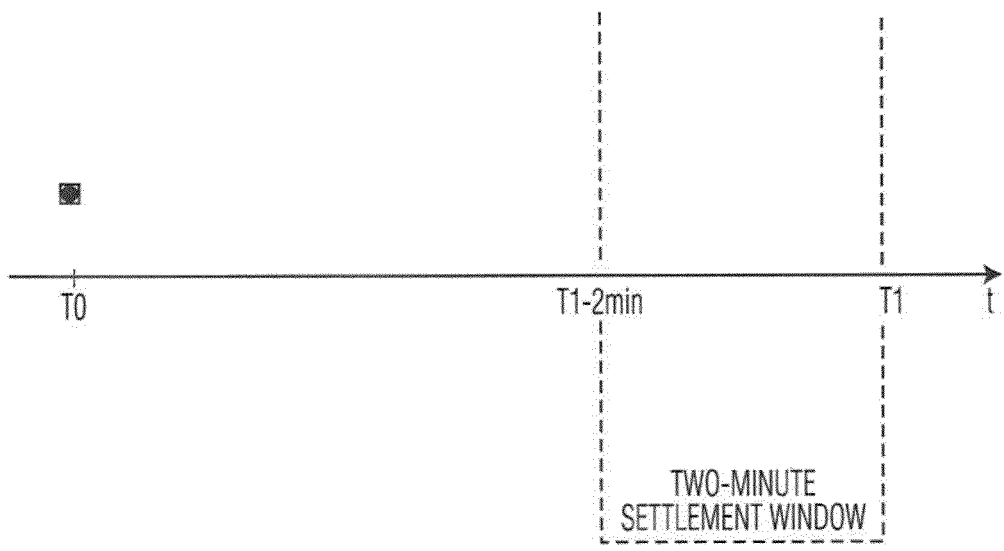

For purposes of this disclosure, an instantaneous price refers to the most reasonable price of a financial instrument at one instant moment, based on the market color at the exact same moment and on the most reasonable price at a previous moment. The following is a listing of possible scenarios that may be considered when calculating an instantaneous price (604), each of which is illustrated in FIGS. 7-9:

Scenario 1. at least one deal and two-way orders are in a timed settlement window of some predetermined length (e.g., a two minute settlement window), plus a deal price is within a two-way order (see FIG. 7);

Scenario 2. at least one deal and a bid are in a timed settlement window, plus a deal price is above the bid price (see FIG. 8(a));

Scenario 3. at least one deal and an offer are in a timed settlement window, plus the deal price is below the offer price (see FIG. 8(b));

Scenario 4. at least one deal and a two-way order are in a timed settlement window, but the deal price is not within the two-way order (see FIG. 8(c));

Scenario 5. at least one deal and an offer are in a timed settlement window, but the deal price is above the offer price (see FIG. 8(d));

Scenario 6. at least one deal and bid are in a timed settlement window, but the deal price is below the offer price (see FIG. 8(e));

Scenario 7. there are deals outside a timed settlement window (none inside the timed settlement window), and a two-way order inside settlement window, but the last deal price outside the settlement window is not within the two-way order price range (see FIG. 8(f));

Scenario 8. there are deals outside the timed settlement window (none inside the timed settlement window), and a two-way order inside settlement window, plus the last deal price outside the settlement window is within the settlement window is within the two-way order price range (see FIG. 9(a));

Scenario 9. there are no deals for a particular day, and there is a two-way order inside a timed settlement window. Additionally, the historical settlement price is within the two-way price range (see FIG. 9(b));

Scenario 10. there are no deals for a particular day, and there is a two-way order inside a timed settlement window. Additionally, the historical settlement price is not within the two-way price range (see FIG. 9(c));

Scenario 11. there is no market color inside a timed settlement window, but there are deals outside settlement window (see FIG. 9(d)); and Scenario 12. there is no market color for a particular day (see FIG. 9(e)).

For purposes of illustration, Scenario 1 described above is depicted in FIG. 7. Within a timed settlement window (701), which is a two-minute window in this illustration, it is assumed that one or more deals (702) and two-way orders (704a-b) exist within a trading system. Since at least one deal (702) and a two-way order (704a-b) exist within the timed settlement window (701), market color data from outside of the timed window (701) is not needed to determine an instantaneous price.

The moment a deal (702) enters the timed settlement window (701), the actual price of the deal (702) may be considered the most 'reasonable' price at that moment. As a result, the instantaneous price (702a) at that moment may be set as the deal price (702). When a two-way order (704a-b) enters the settlement window (701), the instantaneous price at that moment will be somewhere between the bid (704a) and the offer price (704b) of the two-way order. If the two-way order was the only item within the timed settlement window (701), each price within the range of prices between, the bid price (704a) and offer price (704b) could reasonably be set as the instantaneous price. However, since in this illustration a deal price (702) and a two-way order (704a-b) exist, the instantaneous price (703) may be determined by combining the previously set instantaneous price (702a) (set as the moment the deal price entered the timed window (701)) and the two-way order (704a-b). As show in FIG. 7, the previous instantaneous price (702a), which happens to be the deal price (702), is within the two-way price range (704a-b). As a result, the second instantaneous price (703), i.e., the instantaneous price at the time the two-way order (704a-b) enters the settlement window (701), may be set equal to the previous instantaneous price (702a).

As a second example of determining an instantaneous price (604), reference is made to FIG. 8(c), which depicts Scenario 4 described above. Similar to Scenario 1, there is sufficient market information within the timed settlement window (801) to determine an instantaneous price. Following the same logic of Scenario 1, the instantaneous price (802a) at the deal moment may be set to the deal price (802) itself. Contrary to Scenario 1, however, this initial instantaneous price (802a) is not within the bid (804a) and offer (804b) spread. This means that market information provided by the deal (802) is inconsistent with the information provided by the two-way order (804a-b). As a result, the midpoint of the bid-offer (804a-b) spread may be set as the instantaneous price (803).

As a third example of determining an instantaneous price (604), reference is made to FIG. 9(a), which depicts Scenario 8 described above. In this scenario, there are no deals inside the timed settlement window (901), and one two-way order (904a-b) inside the settlement window (901). If it is determined that the market information provided by this two-way order (904a-b) is not sufficient, to determine an instantaneous price (903), information pertaining to deals outside of the timed settlement window (901) may be considered. Each moment a new deal (802) occurs, the instantaneous price at that time may be set to the then-current deal price (802), even if none of the deals are within the timed settlement window (901). Just prior to commencement of the timed settlement window (901), a deal (902) having an instantaneous price (902a) occurs. Since this instantaneous price (902a) is within the bid (904a) and offer (904b) spread, the instantaneous price (903) at the moment of two-way order (904a-b) may be set to the instantaneous price (902a) of that deal that occurred just before commencement of the timed settlement window (901).

Referring again to FIG. 6, the exemplary weighting algorithm (610) may be configured to determine a weighted blending of instantaneous prices (605). In one aspect, weighted blending combines all the instantaneous prices on each market to provide a reference price and its weight, a lower limit price (i.e., a lower bound) and its weight, as well as an upper limit price (i.e., an upper bound) and its weight. This weighted blending procedure (605) may be expressed by the following equations:

$$\hat{P}_{t_2} = \frac{\hat{P}_{t_1} \exp(-\lambda(t_2-t_1)) + \hat{P}_{t_2} w}{w \exp(-\lambda(t_2-t_1)) + w} \quad (9)$$

where $\hat{P}_{t_1}$ and $\hat{P}_{t_2}$ are the reference price at time $t_1$ and $t_2$, respectively. $\lambda$ is the time decay parameter (the larger $\lambda$ is, the faster the previous market information decays). w is the unit weight for each market color and its' value is given by:

$$w = \begin{cases} \text{quantity of deal} \times & \text{if the type of the market} \\ \text{deal weight} & \text{color is deal} \\ \text{quantity of order} \times & \text{if the type of the market} \\ \text{order weight} & \text{color is order.} \end{cases} \quad (10)$$

The reference weight may be updated according to the following formula:

$$W(t_2) = W(t_1)\exp(-\lambda(t_2-t_1))+w, \quad (11)$$

where $W(t_1)$ and $W(t_2)$ are the reference weight of $t_1$ and $t_2$, respectively. The upper and lower price bounds and their weight may be updated using similar approaches to formulas (9)-(11).

Thus, the six compressed parameters for each market include: reference price and weight of reference price (606), lower price bound ad weight of lower price bound (607), and upper price bound and weight of upper price bound (608). These parameters may then be fed to an optimization module (to calculate an optimized price that can satisfy all the financial relations and closely reflect relevant market information).

Options Markets Blending

Discovering market prices that satisfy all the financial relations within an option-complex network (i.e., a financial network comprising options markets) may be accomplished via options market blending. Although this type market blending is described with reference to options markets, it may equally be applied to other types of markets.

Figure 10:
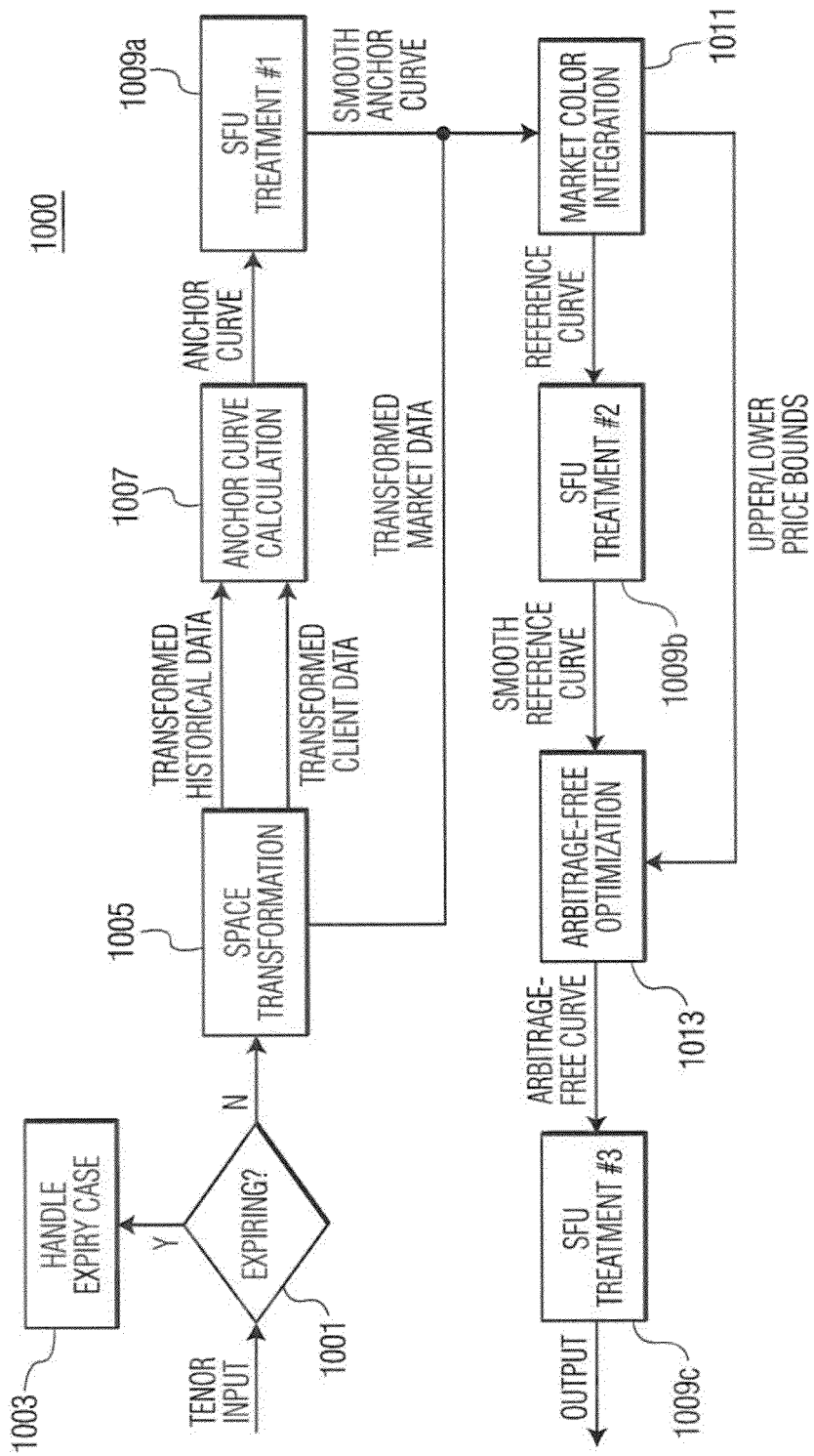
FIG. 10 illustrates a diagram of an exemplary process that may be utilized for options pricing in accordance with this disclosure.
Figure 11:
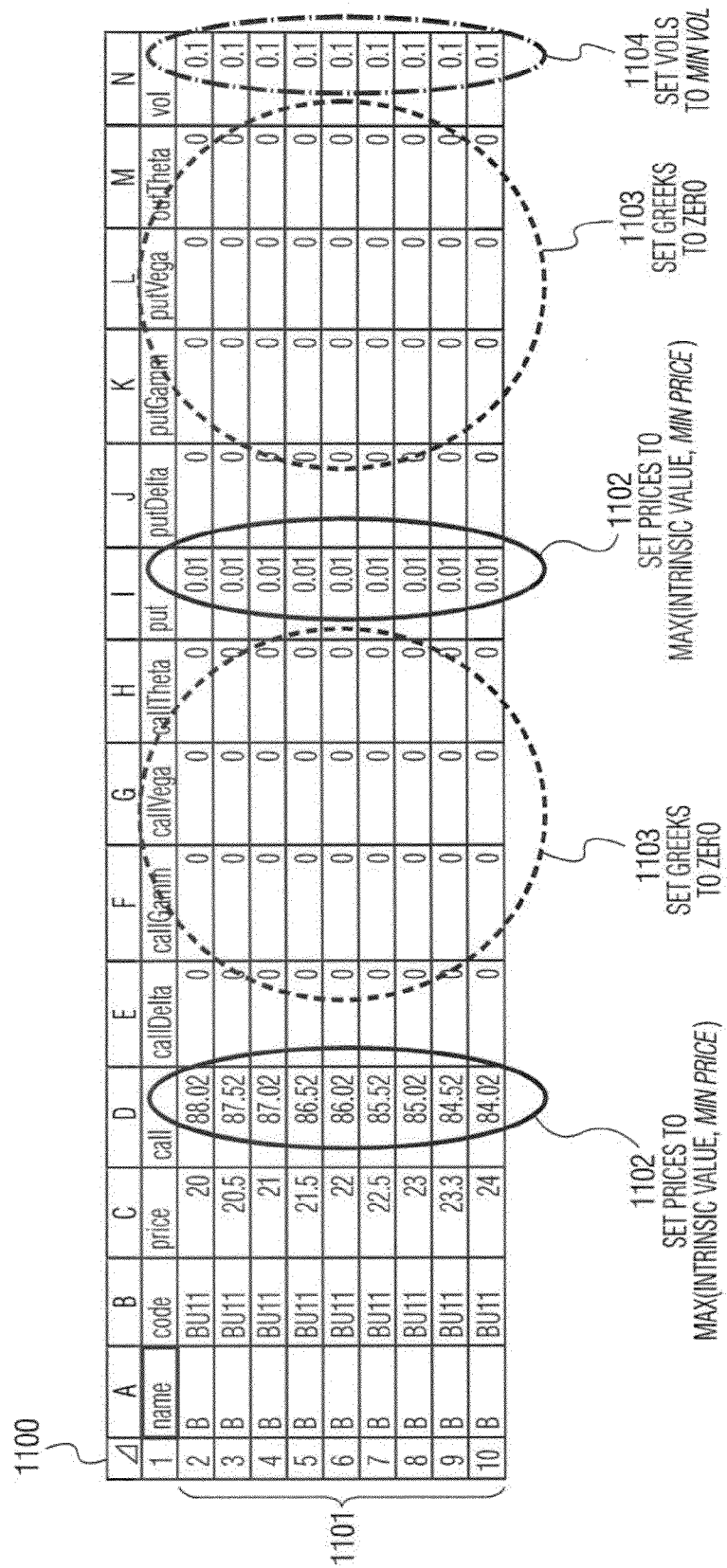
FIG. 11 illustrates an exemplary product file relating to expiring options in accordance with this disclosure.

Options markets may be considered as derivatives of underlying markets, which depend on various factors such as underlying market prices, volatility, time to expiration, etc. Thus, the blending of options markets considers all such factors and information. FIG. 10 provides an exemplary blending process (1000) that may be implemented by the CE technology that considers pertinent market data and information for options markets. In this exemplary blending process (1000), it is first determined whether tenor input includes expiring options (1001). If so, the expiring options are adjusted (1003). Otherwise, the process (1000) performs a strike space transformation (1005) for non-expiring (and/or adjusted) options. Then, an anchor curve representing the value of options across different strikes is calculated (1007), and smoothed via a smoothing functional utility (SFU) treatment (1009a). Next, market color of options with the same underlying tenor are incorporated into the smoothed anchor curve (1011) to generate a reference implied value curve, which is then smoothed via an SFU treatment (1009b). The resulting smoothed implied value curve is processed through an arbitrage-free optimization (1013) to generate an arbitrage-free curve, which is smoothed once again (1009c) prior to final output.

Each of the sub-processes (1003-1013) comprising the exemplary markets blending process (1000) of FIG. 10 is further discussed below in greater detail.

Option Expiry Treatment (1003).

On an options expiry day, all the regular settlement algorithms may be bypassed and the following adjustments may be made to expiring options:

1. the option price may be set to either its intrinsic value or to a minimum price (that may be specified, for example, in a product configuration file), whichever is larger;

2. option variables (e.g., call and put variables identified with Greek letters, thus referred to as "Greeks") may be set to zero; and 3. implied volatilities may be set to a minimum volatility (this may also be specified, for example, in a product configuration file).

An illustrative example of a product file (1100) including a listing of expiring options (1101) is shown in FIG. 1. As shown, the option price of each product (1101) is set to the maximum of intrinsic value and minimum price (1102), option variables (e.g., call and put gamma/vega) are set to zero (1103), and the implied volatilities are set to a minimum volatility (1104).

Strike Space Transformation (1005).

Strike space transformation (1005) considers underlying price movements and incorporates underlying dynamic prices into strike prices. There are four options for strike space transformation, which can be specified for each financial instrument. If S is used to denote an underlying price and K is used to denote a strike price, the four transformation options can be expressed as:

1. No transformation. The space parameter is still the strike price, K.
2. Moneyness. The new space parameter is the underlying price divided by the strike price, i.e., S/K.
3. Log-moneyness. The new space parameter is the logarithm of moneyness, i.e., log(SK).
4. Distance between the strike price and the underlying price, i.e., K–S.

Notably, the strike space transformation procedure (1005) may be applied to all the input data whenever there is possible underlying price movement. Therefore, this transformation procedure may be performed for historical settlement data, third-party submissions, market input data, etc. In an exemplary implementation, a settlement process may perform log-moneyness transformation for non-spread options, and distance between the strike price and the underlying price transformation for spread options.

Anchor Curve Construction (1007).

An anchor curve is an implied value curve for financial instruments (e.g., options) across different strikes, but with the same underlying instrument and expiry date. The values on the curve depend on the option pricing model being used, and a one-to-one mapping between the implied value and its corresponding call/put option premiums (and Greeks) may be built. Notably, different types of implied values may be used according to the particular option types for which an anchor curve is being constructed. For example, for no-option spread options, an implied volatility curve may be used as an anchor curve; and for spread options, an implied correlation curve may be used as an anchor curve.

Figure 12:
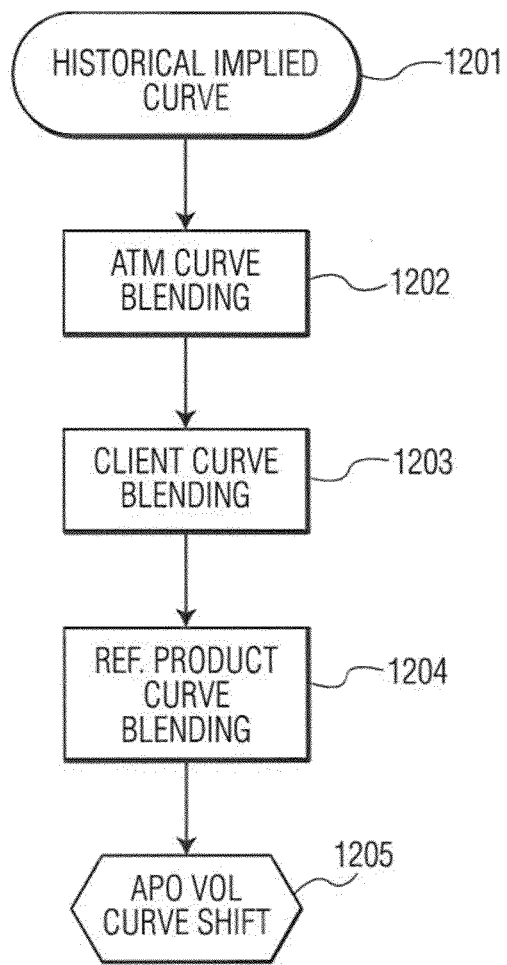
FIG. 12 illustrates an exemplary process for constructing an anchor curve in accordance with this disclosure.

Turning now to FIG. 12, an exemplary process (1200) for constructing an anchor curve in accordance with this disclosure is shown. The construction of an anchor curve (1200) starts with a historical implied settlement curve (1201) upon which at-the-money ("ATM") curve blending (1202), third-party (or client curve) blending (1203), reference product curve blending (1204), and/or average price option ("APO") curve shifting is performed, each of which is further discussed below. Notably, anchor curve construction in accordance with this disclosure takes third-party submissions and operator judgment into account.

ATM Curve Blending (1202).

According to the weight ratio between an ATM curve and a historical curve, which may be specified in the CE as option configuration input (discussed further below), the ATM curve blending procedure takes in historical settlement curves and shifts them according to the difference between a historical ATM implied value and a particular input into CE. Optionally, thus input may be read from an input file, or it may be input directly into CE. Thus, for example, if the historical implied value for a certain underlying tenor at a transformed strike point $k_i$ is $V(k_i)$, the historical ATM implied value may be referred to as $V(k_{ATM})$, the ATM implied value in the ATM input file may be referred to as $V_{ATM}$, and the weight ratio between the ATM curve and historical curve as a:b. Then, after the ATM curve blending process (1202), the updated anchor implied value at $k_i$ may be expressed as:

$$V^{updated}(k_i)=V(k_i)+(a/(a+b))*(V_{ATM}-V(k_{ATM})) \quad (12)$$

Figure 13:
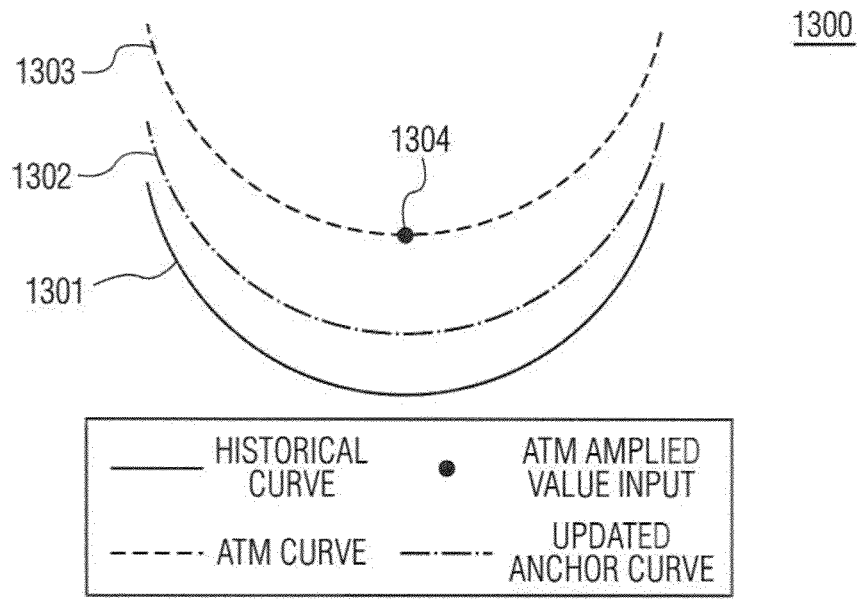
FIG. 13 illustrates exemplary 'at-the-money' (ATM) curve blending in accordance with this disclosure.

FIG. 13 illustrates an example of ATM curve blending (1300) in accordance with this disclosure. The ATM implied value input point (1304) implies an ATM curve (1303) which is parallel to the historical curve (1301). Then, according to a weight ratio between the ATM curve (1303) and the historical curve (1301), which may be input to CE via, for example, an optional configuration file, an anchor curve (1302) may be generated that lies between the ATM curve (1303) and the historical curve (1301), and that is parallel to both.

Notably, not all the financial instruments require an ATM implied value from an input file. It is not required that all the tenors for a financial instrument be listed in such a file. For financial instruments without such input, or without access to ATM implied value input files or tenors not listed in such files, the CE technology may be configured to skip ATM curve blending altogether and use a historical settlement curve for anchor curve generation.

Third-Party (or Client) Curve Blending (1203).

As an initial step, a third-party curve blending process includes combining all third party data and information to generate one combined curve. If certain third-party data reflects transformed strikes $\{k'_{ij}\}$, such transformed strikes may be converted to implied values. Then, linear interpolation (no extrapolation) may be used to generate implied values at a settlement day's transformed strikes $\{k_i\}$. Next, the curves may be combined together according to the weights among third-party submitted curves.

As an illustrative example, it is first assumed that there are m third-party submissions on the options on one underlying tenor. The interpolated implied value at strike $k_i$ submitted by a third party j may be expressed as $V_j(k_i)$, and the weights among third-party submitted curves as $w_1 : w_2 : \ldots : w_m$. Then, the combined implied value at strike $k_i$ may be expressed as:

$$V^{submission}(k_i) = \sum_{j=1}^{m} \frac{w_j}{\sum_{p=1}^{m} w_p} V_j(k_i) \quad (13)$$

Figure 14:
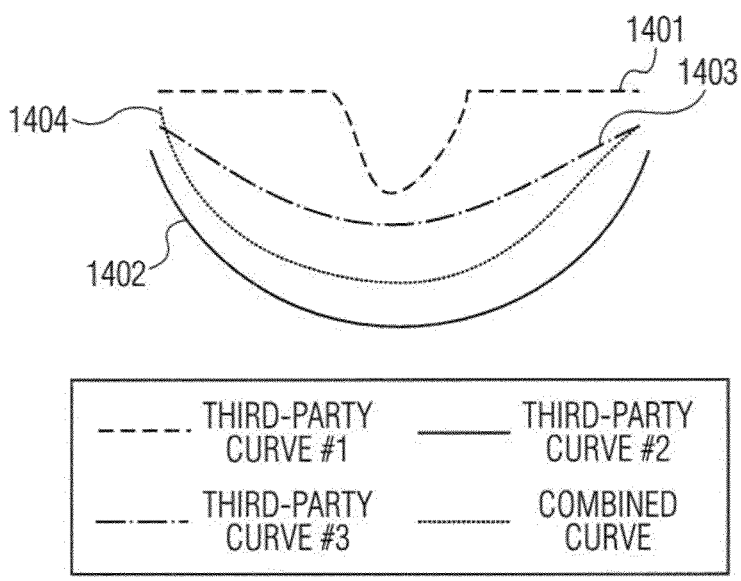
FIG. 14 illustrates exemplary third-party curve blending in accordance with this disclosure.

FIG. 14 illustrates an example of third-party curve blending in accordance with the present disclosure. As shown in FIG. 14, three separate third-party curves (1401, 1402, 1403) are input and may be combined to generate a combined third-party curve (1404).

As a next step of third-party curve blending, a previously generated anchor curve may be blended with the combined third-party curves to generate an updated curve according to the weight ratio between the third-party submitted curves and the anchor curves. To illustrate, it is assumed that for a certain underlying tenor, the implied value at a transformed strike point k; on a previously generated anchor curve is $V(k_i)$, the value at the same transformed strike point on the combined third-party curve is $V^{submission}(k_i)$, and the weight ratio between third-party submitted curve and anchor curve is a:b. After third-party curve blending (discussed above), the updated anchor implied value at $k_i$ can be expressed as:

$$V^{updated}(k_i)=a/(a+b)*V(k_i)+(b/(a+b))*(V^{submission}(k_i)) \quad (14)$$

Figure 15:
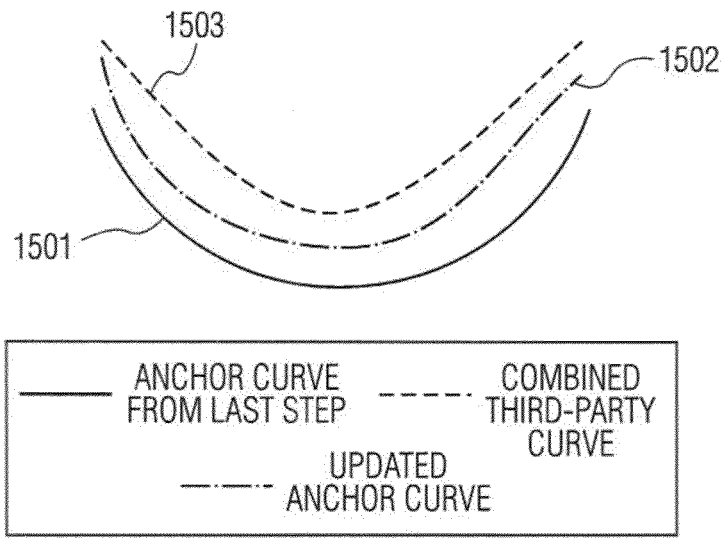
FIG. 15 illustrates exemplary blending of combined third-party curves in accordance with this disclosure.

FIG. 15 illustrates an exemplary blending of a combined third-party curve (1503) with a previously generated anchor curve (1501). The result is a curve (1502) between the other two.

Reference Product Curve Blending (1204).

As indicated above, anchor curve construction (1007) may also involve reference product curve blending (1204). This type of curve blending is applied to financial instruments or products whose settlements depend on other products (i.e., reference products). A reference product's final settlement implied value curve is then blended with the anchor curve of the same tenor of the settlement product according to a predefined weighting.

To illustrate, it is assumed that for a certain underlying tenor, the implied value at a transformed strike point $k_i$ on a previously generated anchor curve is $V(k_i)$, the value at the same transformed strike point on the reference product curve with the same tenor is $V^{ref}(k_i)$, and the reference product weight is w. After a reference product curve blending process according to this disclosure, the updated anchor implied value at $k_i$ may be expressed as:

$$V^{updated}(k_i) = (1-w)V(k_i) + wV^{ref}(k_i) \qquad (15)$$

Figure 16:
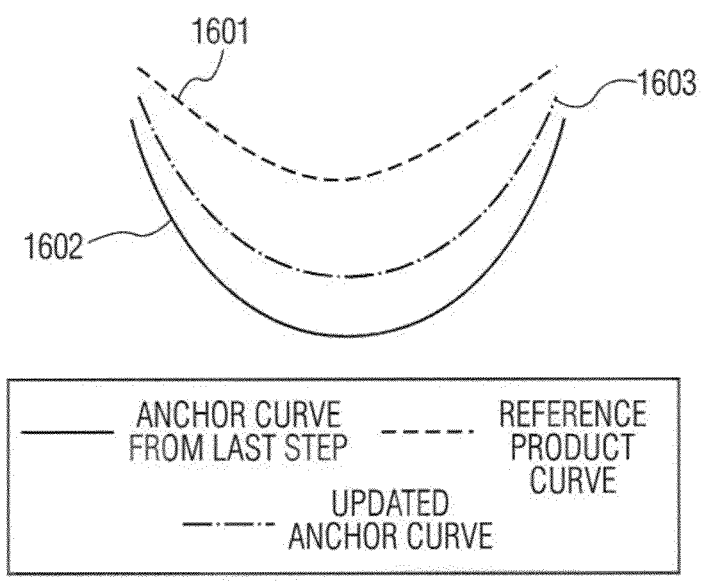
FIG. 16 illustrates exemplary reference product curve blending in accordance with this disclosure.

FIG. 16 illustrates an example of reference product curve blending in accordance with this disclosure. As shown, a reference product's final settlement implied value curve (1601) is blended with the anchor curve of the same tenor of the settlement product according to a predefined weighting (1602) to generate an updated anchor curve (1603).

Average Price Option Curve Shifting (1205).

Anchor curve construction may also involve average price option (APO) curve shifting (1205). For average price options, an implied ATM volatility may be calculated according to the volatilities and the expiry dates of legs. Then, similar to the ATM curve blending process (1202) discussed above, the anchor curve may be shifted to pass the ATM volatility point.

To illustrate, it is assumed that for a certain underlying tenor, the implied value at the transformed strike point $k_i$ and ATM strike point $k_{ATM}$ on the previously generated anchor curve are $V(k_i)$ and $V(k_{ATM})$, and the calculated APO ATM volatility is $V_{APO}$. Thus, after average price option curve blending (1205), the updated anchor implied value at $k_i$ may be expressed as:

$$V^{updated}(k_i) = V(k_i) + (V_{APO} - V(k_{ATM})) \qquad (16)$$

Figure 17:
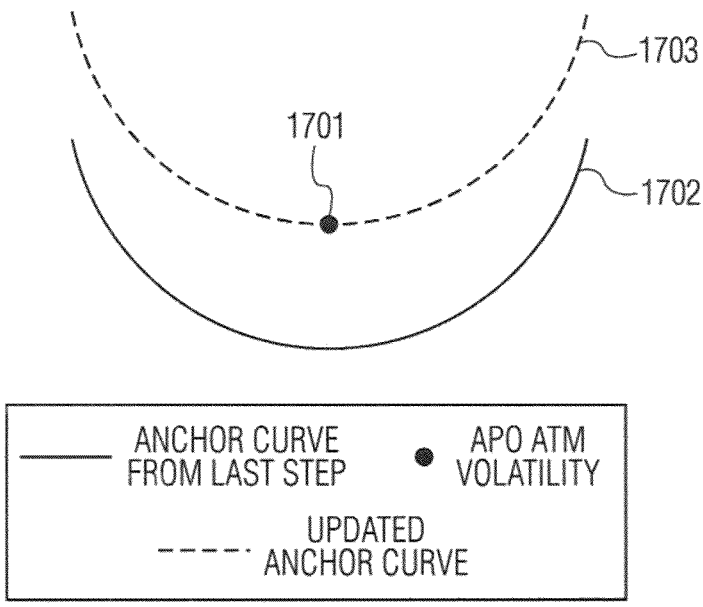
FIG. 17 illustrates exemplary average price option curve shifting in accordance with this disclosure.

FIG. 17 illustrates an example of average price option curve shifting according to the present disclosure. As shown, an ATM volatility point (1701) may be calculated, and then the anchor curve (1702) may be shifted to pass the ATM volatility point (1701). The result is a shifted anchor curve (1703).

Market Color Integration (1011).

Referring again to FIG. 10, after anchor curves are generated (1007), market color of options with the same underlying tenor may be integrated (1011) to generate a reference implied value curve, which may be converted to option premiums and Greeks for final output (see FIG. 10). Market color integration (1011) involves three basic steps, namely, market color weighting and blending, curve twisting, and curve blending. Each of these steps is discussed below.

Market Color Weighting and Blending.

Market color weighting and blending compresses the market color at one transformed strike space point into one implied value, taking anchor value at that point into account.

Market Curve Twisting.

Market color at different moneyness locations will have different impacts to the rest of the curve. In general, market color at strikes near an ATM point will have a more 'global' impact to the entire curve as compared to market color at extreme strikes, which may only have a 'local' impact to their neighboring strikes. The impact range is controlled by filter parameters, which may be predefined and input into a CE system for processing. As a result of market curve twisting, one 'impact' curve for each transformed strike point that has market color may be generated.

Figure 18A:
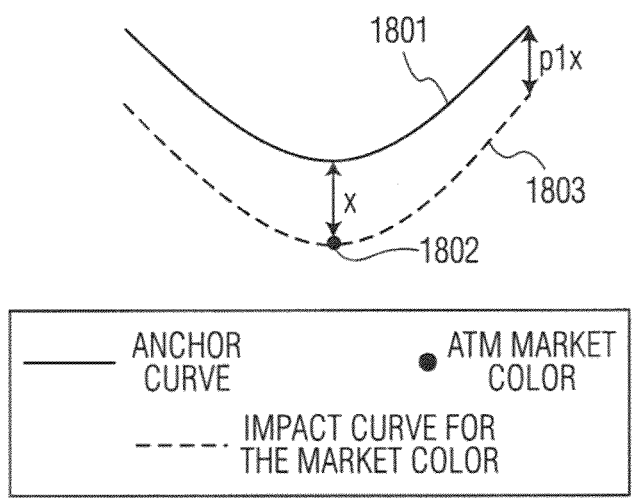
FIG. 18 illustrates an example of market curve twisting in accordance with this disclosure.
Figure 18B:
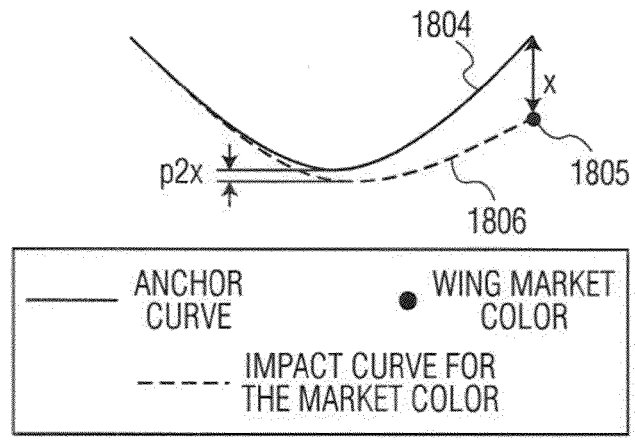

FIG. 18(a) illustrates an example of market curve twisting an anchor curve (1801) for market color at an ATM strike point (1802). The result is an impact curve (1803). FIG. 18(b) illustrates an example of market curve twisting an anchor curve (1804) for market color at a strike wing (minimum/maximum strike point) (1805). The result is an impact curve (1806).

Market Curve Blending.

After determining impact curves via curve twisting, all the curves for one underlying tenor may be blended together to generate a final reference curve. For a strike range that is smaller than the smallest market color strike (i.e., the strike which has market input) or larger than the largest market color strike, a portion of the impact curve of the smallest market color or the largest market color may be utilized for this curve blending. For a strike range that is between two market color strikes $k_1$ and $k_2$, the two impact curves on that portion of the impact curve may be blended together according to the following formula:

$$V(k_i) = V_j(k_i) + (k_i - k_1)/(k_2 - k_1) * [V_2(k_i) - V_1(k_i)] \qquad (17)$$

where $V_1(k_i)$ and $V_2(k_i)$ represent the implied values on the impact curves of the compressed market color.

Figure 19:
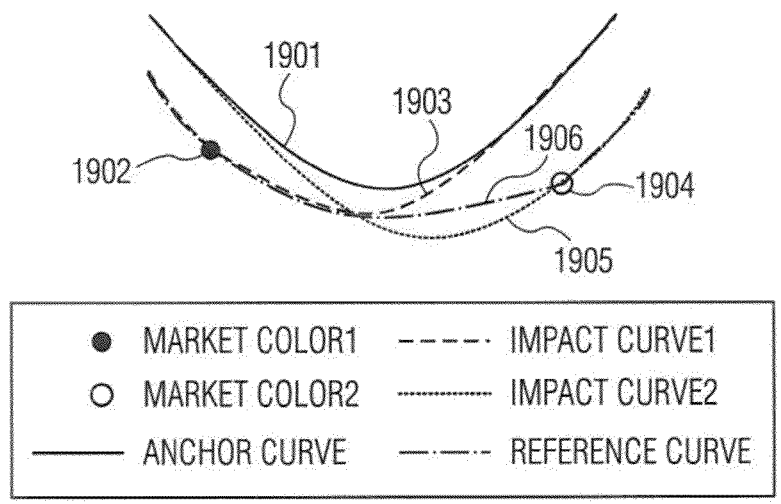
FIG. 19 illustrates an example of market curve blending in accordance with this disclosure.

FIG. 19 illustrates an example of market curve blending. With respect to an anchor curve (1901), a first market color strike (1902) having a corresponding impact curve (1903) and a second market color strike (1904) having a corresponding impact curve (1905) may be blended according to the market curve blending produces discussed above. This results in a final reference curve (1906).

Smoothing Functional Utility (1009a-c).

Referring again to FIG. 10, option pricing may further include SFU treatment (e.g., 1009a-c). SFU (i.e., smoothing functional utility) treatment implements multi-polynomial curve fitting to smooth implied value curves at various algorithm locations during the calculation procedure. The order of the polynomial used to fit the curve can be selected according to predetermined constraints or requirements.

According to FIG. 10, SFU (1009a) first occurs after anchor curve construction (1007) and before market color integration (1011). Implementing SFU at this point will smooth out any 'kinks' introduced during anchor curve construction (1007), especially with respect to third-party curve blending (discussed above), yet fully respect the market colors. As an implementation option, SFU may not be utilized at this point if there is a strong desire to match third-party submissions, since smoothing via SFU may impact the preciseness of the anchor curve.

SFU (1009b) may also occur after market color integration (1011) and before arbitrage-free optimization (1013). Implementing an SFU treatment (1009b) at this point will smooth the implied value curve and provide a curve with a higher smoothness quality for arbitrage-free optimization (1013). Notably, since this SFU treatment (1009b) is applied after-market color integration (1011), deviation from market color may occur. In this case, the match with market color may be sacrificed for the smoothness.

A third SFU treatment (1009c) may occur after arbitrage-free optimization (1013) and before the final output. Smoothing at this point impacts the implied value curve that is ultimately output, however, the call/put price curve may not be arbitrage-free, and the price curves are not necessarily guaranteed to pass any market color points.

Figure 20:
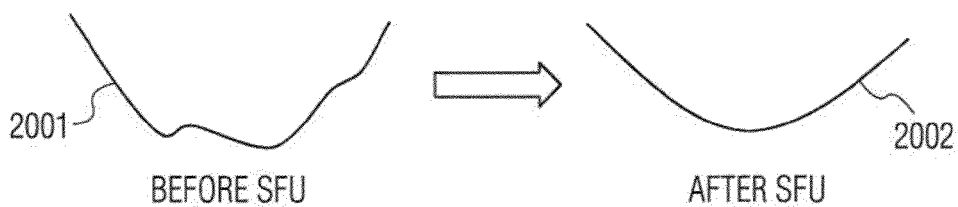
FIG. 20 illustrates an example smoothing function utility (SFU) treatment in accordance with this disclosure.

FIG. 20 illustrates an example of the impact of an SFU treatment on a curve (2001). After SFU smoothing, the curve (2001) becomes clearly smoother (2002) than prior to SFU treatment.

External Settlement Match.

Notably, there may be a need to match external settlement call/put prices. In such cases, externally settled call/put prices (non-zero values) may be provided as inputs to a CE system.

During a calculation process, such prices may be treated as market deal inputs, and the underlying prices may be used to perform strike space transformation (e.g., 1005). This process may be used to improve the curve quality, however, price match may not be guaranteed. As a result, during the output process, output prices may be examined and corrected to reflect the external settlement prices.

Optimization Problem.

To this point, the present disclosure has discussed building up a financial complex network and generating blended market information, either on a market base or on groups of markets for options markets. A defined financial complex network and the results of the blended market information may then be utilized to form constraints and objectives to define an optimization problem that when solved, provides a pricing framework for a financial complex network. Notably, feasible solutions for unknowns in such an optimization problem form a search space, which is defined according to the constraints. For purposes of this disclosure, a search space may have two general parts: a solution space and a valid space. The solution space may be characterized as the null space of Eq. (3), which may optionally be set to avoid being empty, or as the feasible solutions of Eqs. (5) and (8) above. The valid space may be referred to as defining a valid range for each market in a financial complex network, such that $$l \leq x \leq u \tag{18}$$

where l is a lower bound vector and u is an upper bound vector respectively.

The intersect of the solution space and the valid space defines the search space of the optimization problem, which is defined as a feasible problem when it is not empty.

There are at least four options for defining a valid space, including (without limit):

1. a free boundary, approach which uses product level maximum and minimum prices, or even $-\infty$ to $\infty$, when feasible (e.g., some prices can never go negative, as a result, $-\infty$ may not be feasible). This choice provides substantial freedom to the search space, and may, with very low probability, increase the runtime for some optimization/search algorithms. Moreover, the resulting solution may sometimes go beyond the bid/offer bounds.

2. a last bid/offer approach considers the last top of book bid/offer as the lower and upper bounds. This may be preferable from an economic sense, but there may be risks associated with this approach.

3. an in-window bid/offer average approach initially sets the lower and upper bounds according to the free boundaries approach (defined above). If there are bids or offers in a timed settlement window, their average overwrites the boundary.

4. a blended bid/offer approach uses lower and upper bounds from a blending procedure (e.g., market blending discussed above). This option is similar to option 3 above, but applies blending (of a settlement day), rather than averaging (in a timed settlement window).

Except for the free boundary approach, the options for defining a valid space discussed above narrow down the search space of the optimization problem and avoid non-sensible solutions.

Objective Function

As indicated above, an objective function may be defined to minimize the price changes throughout a financial complex network with respect to its reference prices resulting from the blending procedures discussed above. If no market color is available, the prices may be expected to remain unchanged, unless there are changes in other sensitive factors. This may occur, for example, for illiquid hubs having no links to the remainder of the financial complex network if other market conditions such as interest rates and underlying markets for options remain 'stable'.

In defining an objection function, the following notations may be used:

$x_i^{ref}$: the reference price for market i
$x_i^{l}$: the lower bound for $x_i^{ref}$ given by a blending process
$x_i^{u}$: the upper bound for $x_i^{ref}$ given by a blending process
$w_i^{ref}$: the weight for $x_i^{ref}$ given by a blending process
$w_i^{l}$: the weight for $x_i^{ref}$ given by a blending process
$w_i^{u}$: the weight for $x_i^{ref}$ given by a blending process
$s_i$: the additional weight for spread market (this may be predefined and/or input via, for example, a configuration file)
c: the parameter used to adjust how much $x_i^{l}$ and $x_i^{u}$ are considered in the optimization compared to $w_i^{ref}$. The larger the number c, the more the bounds from blending is respected.

In one embodiment, the objective function may be defined as a weighted minimization over related markets:

$$\min_{x_i} \sum_i s_i w_i^{ref}(x_i - x_i^{ref})^2 \tag{19}$$

In certain circumstances, the above function (19) may yield an infeasible solution. In order to circumvent this, a derivative version of the objective function may be expressed as:

$$\min_{x_i} \sum_i s_i (w_i^{ref}(x_i - x_i^{ref})^2 + c[w_i^{u}(x_i - x_i^{u})^{+} + w_i^{l}(x_i^{l} - x_i)^{+}]) \tag{20}$$

where $$(x_i - x_i^{u})^{+} = \begin{cases} x_i - x_i^{u} & \text{if } x_i > x_i^{u} \\ 0 & \text{if } x_i <= x_i^{u} \end{cases} \tag{21}$$

From the foregoing objective functions, the following mathematical form of an optimization problem may be expressed as:

For non-options markets:

$$\min_{x_i} \sum_i s_i w_i^{ref}(x(i) - x_i^{ref})^2 \tag{22}$$

$$\text{Subject to: } A \times x = 0 \tag{23}$$

$$l_i \leq x_i \nleq u_i, i = 0, 1, n \tag{24}$$

where n is the number of related markets for solving.

For options markets, the optimization problem may be expressed as:

$$\text{minimize} \sum_i (C(k_i) x_i^{ref})^2 + \lambda \int C''(k) dk \tag{25}$$

$$\text{subject to } C(k_i) - C(k_{i+1}) \geq 0 \tag{26}$$

$$C(k_i) - C(k_{i+1}) > -e^{-rt}(k_{i+1} - k_i) \tag{27}$$

$$C''(k_i) \geq 0 \tag{28}$$

$$C(k_i) \leq u_i \tag{29}$$

$$C(k_i) \geq l_i \tag{30}$$

where $k_i$ is the ith strike price, C(k) is the call price at strike k, and λ is a smoothing parameter which comes from an empirical result.

Notably, the foregoing optimization problems reflect market color, achieve static arbitrage-free, and satisfy boundary conditions.

Figure 21:
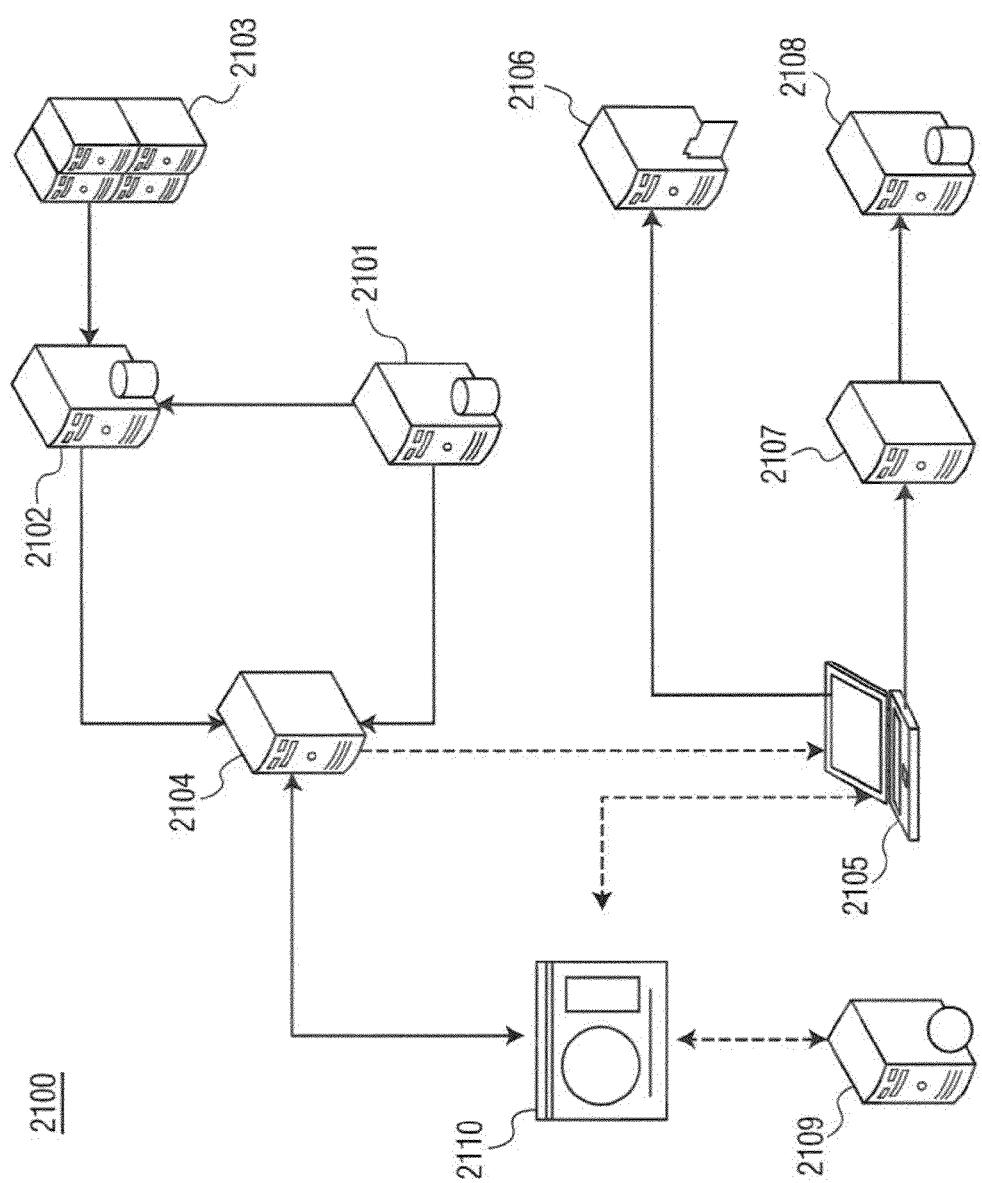
FIG. 21 illustrates an exemplary system embodying curve engine technology in accordance with this disclosure.

In practice, the CE technology described above may be implemented using a system and apparatus comprising one or more computing devices (such as servers) comprising one or more processor executing instructions stored in memory (e.g., such as a database). Turning now to FIG. 21, an exemplary system (2100) depicting CE data flow in accordance with this disclosure is shown. The exemplary system (2100) includes multiple computing devices (2101-2109) in communication with each other via, for example, a wired or wireless communications network. The system (2100) also includes a graphic user interface (GUI) (2110) generated by one or more of the computing devices (e.g., 2105) to enable participants to access and interact with the system (2100). Notably, each of the computing devices (2101-2109) may comprise one or more of a computer (desk top or laptop), server, smartphone, hand-held communication device, tablets, kiosk, and/or any other suitable computing/communication device. Further, any of the devices (2101-2109) may include or be in communication with one or more memory devices, such as databases.

In operation, the exemplary system (2100) may provide data and information pertaining to active markets for financial network complex(es) from a first computing device (2101) to a second computing device (2102). Optionally, this active market data and information may be provided periodically or as desired, as the active markets change (e.g., daily), to update the active market information. Financial complex network definitions (and the involved markets) may then be provided to a host device (2104) from the first computing device (2101), along with price feed information (from device 2103) and order and deal data and information (provided from device 2102). The financial complex network definitions (and related information) may be provided to the host device (2104) in response to queries generated by the host device (2104). Such queries may be made automatically and/or controlled by a GUI (2110) through which operators may access the host device (2104). As further discussed below with respect to FIG. 22, once the host device (2104) receives the network definition and related data and information, it may be configured to process the information, organize a data structure of the complex network, and partition the network into markets.

A computing device such as a user-computer (2105) or a server (2109) may be configured to generate the GUI (2110) for interacting with the host device (2104). This GUI may be configured to call commands on the host device (2104), such as querying the first computing device (2101). The GUI (2110) may also be used to interact with the CE system (2100) in general and to change CE settings.

The user-computer (2105) or server (2109) may also be configured to export input and output files (as a result of interacting with the host device (2104)) to a separate storage device (2106) for storage. In addition, settlement prices may be processed (via 2107) and transferred to another server device (2108).

Figure 22:
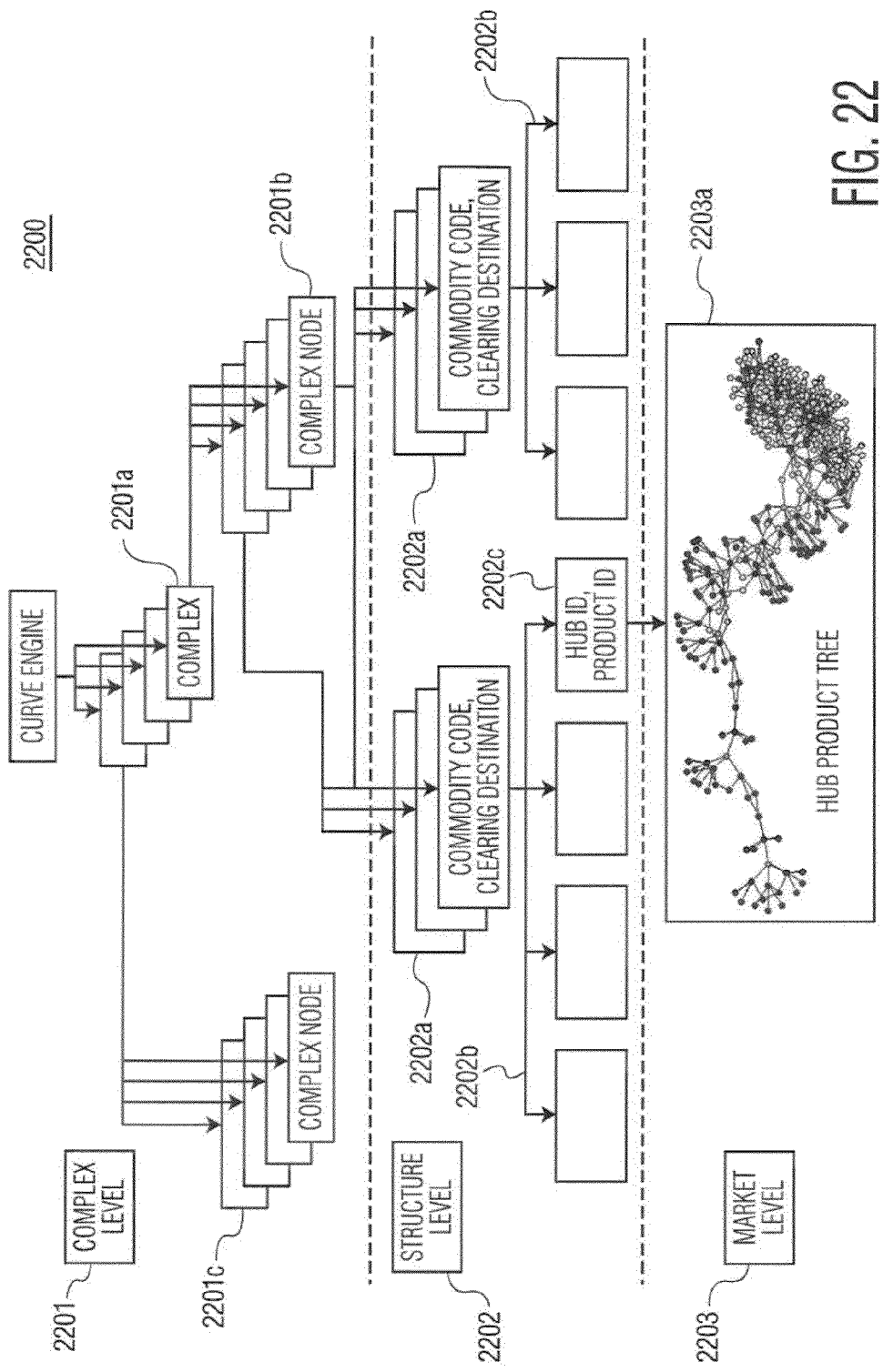
FIG. 22 illustrates a diagram of an exemplary curve engine architecture in accordance with this disclosure.

Turning now to FIG. 22, a diagram of an exemplary CE architecture (2200) in accordance with this disclosure is shown. As show, this architecture (2200) be characterized as a tree-like structure having three distinct levels: a complex level (2201), a structural level (2202) and a market level (2203). The complex level (2201) focuses on the complex definition. Notably, the CE architecture (2200) may accommodate multiple complexes (2201*a*), and one complex may be configured to use another complex's result to perform its calculations. Under each complex (2201*a*), there are several complex nodes (2201*b-c*), which may be defined by quartet (e.g., commodity code, clearing destination, product (future, OTC, option, etc.), and pricing/anchor). Notably, an anchor node may provide data for the calculation of a pricing node. As an example, if the anchor node were a future, and the pricing node were an option, the pricing node may be calculated using the future's data (i.e., the anchor node) as an underlying price.

The structure level (2202) of the exemplary architecture (2200) has two levels of partition: commodity code and clearing destination (2202*a*) and product ID and hub ID (2202*b*). In one embodiment, the second level of partition (2202*b*) may include a third parameter (e.g., product ID), hub ID) and strip ID), or any number of parameters. It is also noted that multiple complex nodes (2201*b-c*) could share a same commodity code and clearing destination pair (2202*a*) as a means to avoid duplication and conflicts.

The market level (2203) of the exemplary architecture (2200) includes an independent product hub tree (2203*a*) which pertains to a single product ID and hub ID pair (2202*c*). In alternative embodiments, different product hub trees (not shown) may be connected within the market level (2203).

Figure 23:
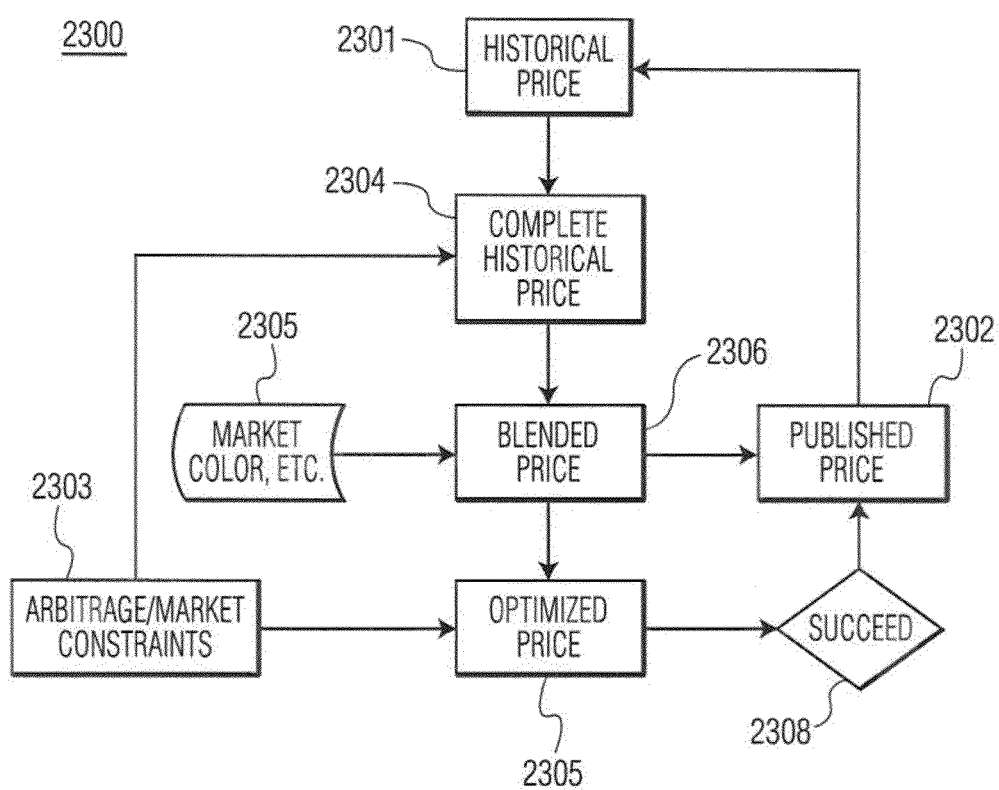
FIG. 23 illustrates the flow of different price states inside an exemplary curve engine in accordance with this disclosure.

Turning now to FIG. 23, an exemplary diagram (2300) shows the flow of the different price states inside an exemplary curve engine. Notably, any of the different stages may commence the cyclical flow depicted. In one embodiment, historical price data (2301) for certain instruments may be pulled or received from on a prior day's published price data (2302). For those instruments that do not have corresponding historic pricing data, the CE technology may determine such prices based on arbitrage and/or market constraints (2303) (e.g., a spread may be determined as leg1-leg2). Collectively, the historical prices (2301) and the determined prices form a completed set of historical price data (2304).

Market color data and information (2305) may then be blended with the complete historical price data (2304) which results in one or more reference prices. These reference prices may then be published (2302). In parallel, the reference prices may be optimized (2307) in connection with arbitrage and/or market constraints (2303). Notably, if optimization (2307) fails (determined at 2308), the non-optimized reference price(s) will simply remain as previously published (2302). Otherwise, if optimization (2307) is successful (determined at 2308), the optimized price(s) will be published (2302) and replace their corresponding, previously published non-optimized reference price(s) (2302). Thus, the published prices (2302) includes a collection of reference prices that have been optimized, and those reference prices for which optimization failed or produced an infeasible solution.

By publishing non-optimized blended prices (2302), and then replacing the non-optimized prices with those that are successfully optimized, the CE technology is able to provide the 'best available' prices at all times. Indeed, this approach accounts for instances when optimization fails and/or produces an infeasible solution. In those cases, even though the published prices are not optimal, they will still provide a fairly accurate representation of current markets/market color.

In one exemplary aspect, the curve engine technology may be embodied as a computer-implemented method or process of pricing financial instruments. This exemplary method or process includes providing at least one computing device comprising one or more processors executing computer-executable instructions stored in memory to implement the curve engine technology. The at least one computing device may include one or more of a desktop computer, a laptop computer, a server, a smartphone, a hand-held communication device, a tablet device, a kiosk, a wired or wireless communications network, or any other wired or wireless computing and/or communication device or apparatus.

In operation, the instructions cause the at least one computing device to perform step of constructing a virtual financial complex network that includes one or more interrelated financial markets. This constructing step may optionally include grouping the one or more financial markets according to a market structure or arbitrage conditions, and linking financial markets within each grouping according to package relations (amongst financial markets), spread relations (amongst financial markets) and/or arbitrage constraints. In one aspect, financial markets comprising futures, forwards, and over-the-counter (OTC) financial instruments may be linked within the financial complex network based on package or spread relations, and in another aspect, financial markets comprising options financial instruments may be linked within the financial complex network based on arbitrage constraints.

Optionally, the financial complex network may be constructed or expanded by linking one or more markets having inter-market and/or intra-market connections. Such connections may result in the financial complex network spanning two or more calendar years.

Once the virtual financial complex network is constructed, the computer-implemented method involves blending market color data related to at least one of the financial markets with price data to determine blended pricing information. As noted above, market color data may include any data or information relating to financial markets, including (without limit) bids, offers, deals, orders, historic settlement prices, current market configurations, active market lists, third-party suggested settlement prices, execution venue deals, depth of market information, external settlement prices, third-party data, historical mutually dependent pricing relationships, inter and intra-instrument no-arbitrage constraints, etc.

This blending step may include, for at least one financial market, calculating an instantaneous price for financial instruments across the financial markets included in the complex network, blending all instantaneous prices, by financial market, with market color data to determine a reference price, a lower bound price and a upper bound price, and applying predetermined weighting parameters to the blended instantaneous prices to determine a weighting factor for each of the reference price, the lower bound price and the upper bound price.

For options markets comprising options financial instruments, this blending step may include an options market blending step that involves determining whether tenor input includes expiring options, and if so, adjusting the expiring options, performing a strike space transformation (on the non-expiring and adjusted options), and calculating an anchor curve representing the value of one or more options across different strikes. In one aspect, calculating the anchor curve may include applying one or more of an at-the-money (ATM) curve blending process, a third-party curve blending process, a reference product curve bending process, and an average price option (APO) curve shifting process to one or more historical settlement curves. Separately, the anchor curve may include an implied volatility curve for non-spread options, and/or an implied correlation curve for spread options.

The options market blending step further involves integrating market color data pertaining to options having a same underlying tenor into the anchor curve to generate a reference implied value curve. This market color data integrating step may itself comprise generating an impact curve for each transformed strike point on the anchor curve having market color, and blending one or more of the impact curves together to generate the reference implied value curve. Arbitrage-free optimizing the reference implied value curve is then performed to generate an arbitrage-free curve.

As an option, a smoothing functional utility (SFU) curve treatment may be applied to any of the anchor curve, the reference implied value curve and the arbitrage-free curve generated as a result of the options market blending step.

Following the blending step(s) discussed above, the computer-implemented method includes defining an objective function based on the blended pricing information (determined as a result of the blending step(s)). Defining such an objection function may include defining a search space that sets bounds for feasible solutions to the objective function based on a solution space and a valid space. This solution space may include a null space or a range of feasible solutions, and the valid space may include a valid range (of prices) for each of the financial markets, where the valid range is defined by, in part, a lower bound vector based on a predetermined lower bound price and an upper bound vector based on a predetermined upper bound price. Notably, the intersection of the solution space and the valid space is what defines the search space.

Upon defining the objective function, the computer-implemented method involves solving the objective function using an optimization model that determines a minimum market price for each financial instrument across the financial markets included in the financial complex network. Such an optimization model may be configured to solve the objective function and provide an optimal pricing solution across each of the financial markets based on and within certain predetermined constraints.

In another exemplary aspect, the curve engine technology may be embodied as a system for pricing financial instruments. This exemplary system may include at least one computing device comprising one or more processors executing computer-executable instructions, such as program modules, stored in memory to implement the curve engine technology. Generally, program modules may include routines, programs, objects, components, data structures, or the like that perform particular tasks or implement particular abstract data types. The at least one computing device may be one or more of a desktop computer, a laptop computer, a server, a smartphone, a hand-held communication device, a tablet device, a kiosk, a wired or wireless communications network, or any other wired or wireless computing and/or communication device or apparatus.

In operation, the at least one computing device is configured to construct a virtual financial complex network that includes one or more interrelated financial markets. In this respect, the computing device may be further configured to group the one or more financial markets according to a market structure or arbitrage conditions, and link financial markets within each grouping according to package relations (amongst financial markets), spread relations (amongst financial markets) and/or arbitrage constraints. In one aspect, financial markets comprising futures, forwards, and over-the-counter (OTC) financial instruments may be linked within the financial complex network based on package or spread relations, and in another aspect, financial markets comprising options financial instruments may be linked within the financial complex network based on arbitrage constraints.

Optionally, the at least one computing device may be configured to construct or expand the financial complex network by linking one or more markets having inter-market and/or intra-market connections. Such connections may result in the financial complex network spanning two or more calendar years.

In addition to constructing the virtual financial complex network, the at least one computing device may be configured to blend market color data related to at least one of the financial markets with price data to determine blended pricing information. This market color data may include any data or information relating to financial markets, including (without limit) bids, offers, deals, orders, historic settlement prices, current market configurations, active market lists, third-party suggested settlement prices, execution venue deals, depth of market information, external settlement prices, third-party data, historical mutually dependent pricing relationships, inter and intra-instrument no-arbitrage constraints, etc.

This blending feature may include, for at least one financial market, calculating an instantaneous price for financial instruments across the financial markets included in the complex network, blending all instantaneous prices, by financial market, with market color data to determine a reference price, a lower bound price and a upper bound price, and applying predetermined weighting parameters to the blended instantaneous prices to determine a weighting factor for each of the reference price, the lower bound price and the upper bound price.

For options markets comprising options financial instruments, the at least one computing device may be configured to determine whether tenor input includes expiring options, and if so, adjust the expiring options, perform a strike space transformation (on the non-expiring and adjusted options), and calculate an anchor curve representing the value of one or more options across different strikes, in one aspect, calculating the anchor curve may include applying one or more of an at-the-money (ATM) curve blending process, a third-party curve blending process, a reference product curve bending process, and an average price option (APO) curve shifting process to one or more historical settlement curves. Separately, the anchor curve may include an implied volatility curve for non-spread options, and/or an implied correlation curve for spread options.

The at least one computing device may further be configured to integrate market color data pertaining to options having a same underlying tenor into the anchor curve to generate a reference implied value curve in connection with options markets. This market color data integration feature may itself comprise generating an impact curve for each transformed strike point on the anchor curve having market color, and blending one or more of the impact curves together to generate the reference implied value curve. In addition, the at least one computing device may be configured to perform arbitrage-free optimizing on the reference implied value curve to generate an arbitrage-free curve.

As an option, the at least one computing device may further be configured to apply a smoothing functional utility (SFU) curve treatment to any of the anchor curve, the reference implied value curve and the arbitrage-free curve previously generated.

The at least one computing device may also be configured to define an objective function based on blended pricing information (determined as a result of executing the blending features discussed above). Defining such an objection function may include defining a search space that sets bounds for feasible solutions to the objective function based on a solution space and a valid space. This solution space may include a null space or a range of feasible solutions, and the valid space may include a valid range (of prices) for each of the financial markets, where the valid range is defined by, in part, a lower bound vector based on a predetermined lower bound price and an upper bound vector based on a predetermined upper bound price. Notably, the intersection of the solution space and the valid space is what defines the search space.

Once the objective function is defined, the at least one computing device may be configured to solve the objective function using an optimization model that determines a minimum market price for each financial instrument across the financial markets included in the financial complex network. Such an optimization model may be configured to solve the objective function and provide an optimal pricing solution across each of the financial markets based on and within certain predetermined constraints.

The foregoing examples are provided merely for the purpose of explanation and are in no way to be construed as limiting. While reference to various embodiments are shown, the words used herein are words of description and illustration, rather than words of limitation. Further, although reference to particular means, materials, and embodiments are shown, there is no limitation to the particulars disclosed herein. Rather, the embodiments extend to all functionally equivalent structures, methods, and uses, such as are within the scope of the appended claims.

The invention claimed is:

1. A method of pricing financial instruments, comprising:
   providing at least one computing device comprising one or more processors executing computer-executable instructions stored in memory, said instructions causing the at least one computing device to perform the steps of:
   constructing a virtual financial complex network comprising two or more interrelated financial markets;
   blending market color data related to at least one of the interrelated financial markets with price data to determine blended pricing information;
   defining an objective function based on the blended pricing information; and
   solving the objective function using an optimization model that determines a minimum market price for each financial instrument across the two or more interrelated financial markets.

2. The method of claim 1, wherein the constructing step comprises:
   grouping the two or more interrelated financial markets according to a market structure or arbitrage conditions; and
   linking the interrelated financial markets within each grouping according to at least one of a package relation, a spread relation and arbitrage constraints.

3. The method of claim 2, wherein a first grouping comprises interrelated financial markets comprising futures, forwards, and over-the-counter (OTC) financial instruments that are linked within the financial complex network based on package or spread relations, and wherein a second grouping comprises interrelated financial markets comprising options financial instruments that are linked within the financial complex network based on arbitrage constraints.

4. The method of claim 2, further comprising:
   linking one or more additional markets to said virtual financial complex network, said additional markets having at least one of inter-market and intra-market connections to the interrelated financial markets within the virtual financial complex network.

5. The method of claim 1, wherein the virtual financial complex network comprises linked interrelated financial markets that span two or more calendar years.

6. The method of claim 1, wherein the blending step comprises:

for at least one of the two or more interrelated financial markets:
calculating an instantaneous price for each financial instrument in said at least one of the interrelated financial markets;
blending all instantaneous prices, by financial market, with said market color data to determine a reference price, a lower bound price and a upper bound price, and
applying predetermined weighting parameters to the blended instantaneous prices to determine a weighting factor for each of the reference price, the lower bound price and the upper bound price.

7. The method of claim 1, wherein the blending step comprises an options market blending step for the interrelated financial markets comprising options financial instruments, said options market blending step comprising:
determining whether tenor input includes expiring options, and if so, adjusting said expiring options;
performing a strike space transformation;
calculating an anchor curve representing the value of one or more options across different strikes;
integrating market color data pertaining to options having a same underlying tenor into the anchor curve to generate a reference implied value curve; and
arbitrage-free optimizing the reference implied value curve to generate an arbitrage-free curve.

8. The method of claim 7, further comprising applying a smoothing functional utility (SFU) curve treatment to at least one of the anchor curve, the reference implied value curve and the arbitrage-free curve.

9. The method of claim 7, wherein the anchor curve comprises an implied volatility curve for non-spread options, and wherein the anchor curve comprises an implied correlation curve for spread options.

10. The method of claim 7, wherein calculating the anchor curve comprises:
applying one or more of an at-the-money (ATM) curve blending process, a third-party curve blending process, a reference product curve bending process, and an average price option (APO) curve shifting process to one or more historical settlement curves.

11. The method of claim 7, wherein integrating market color data comprises:
generating an impact curve for each transformed strike point on the anchor curve having market color; and
blending one or more of the impact curves together to generate the reference implied value curve.

12. The method of claim 1, wherein defining an objective function comprises:
defining a search space based on a solution space and a valid space, said search space defining bounds for solutions to the objective function.

13. The method of claim 12, wherein the solution space comprises a null space or a range of solutions,
wherein the valid space defines a valid range for each of the two or more interrelated financial markets, said valid range being defined, in part, by a lower bound vector based on a lower bound price and an upper bound vector based on an upper bound price, and
wherein the intersection of the solution space and the valid space define said search space.

14. The method of claim 1, wherein the optimization model solves the objective function and provides an optimal pricing solution across each of the two or more interrelated financial markets within predetermined constraints.

15. The method of claim 1, wherein the at least one computing device comprises one or more of a desktop computer, a laptop computer, a server, a smartphone, a hand-held communication device, a tablet device, a kiosk, and a wired or wireless communications network, and
wherein said market color data comprises data relating to at least one of bids, offers, deals, orders, historic settlement prices, current market configurations, active market lists, third-party suggested settlement prices, execution venue deals, depth of market information, external settlement prices, third-party data, historical mutually dependent pricing relationships, and inter and intra-instrument no-arbitrage constraints.

16. A system for pricing financial instruments, comprising:
at least one computing device comprising one or more processors executing computer-executable instructions stored in memory, said at least one computing device being configured to:
construct a virtual financial complex network comprising two or more interrelated financial markets;
blend market color data related to at least one of the interrelated financial markets with price data to determine blended pricing information;
define an objective function based on the blended pricing information; and
solve the objective function using an optimization model that determines a minimum market price for each financial instrument across the two or more interrelated financial markets.

17. The system of claim 16, wherein the at least one computing device is further configured to:
group the two or more interrelated financial markets according to a market structure or arbitrage conditions; and
link the interrelated financial markets within each grouping according to at least one of a package relation, a spread relation and arbitrage constraints.

18. The system of claim 17, wherein a first grouping comprises interrelated financial markets comprising futures, forwards, and over-the-counter (OTC) financial instruments that are linked within the financial complex network based on package or spread relations, and wherein a second grouping comprises interrelated financial markets comprising options financial instruments that are linked within the financial complex network based on arbitrage constraints.

19. The system of claim 17, wherein the at least one computing device is further configured to:
link one or more additional markets to said virtual financial complex network, said additional markets having at least one of inter-market and intra-market connections to the interrelated financial markets within the virtual financial complex network.

20. The system of claim 16, wherein the virtual financial complex network comprises linked interrelated financial markets that span two or more calendar years.

21. The system of claim 16, wherein the at least one computing device is further configured to:
for at least one of the two or more interrelated financial markets:
calculate an instantaneous price for each financial instrument in said at least one of the interrelated financial markets;
blend all instantaneous prices, by financial market, with said market color data to determine a reference price, a lower bound price and a upper bound price, and
apply predetermined weighting parameters to the blended instantaneous prices to determine a weighting factor for each of the reference price, the lower bound price and the upper bound price.

22. The system of claim 16, wherein:
for the interrelated financial markets comprising options financial instruments, the at least one computing device is further configured to:
determine whether tenor input includes expiring options, and if so, adjusting said expiring options;
perform a strike space transformation;
calculate an anchor curve representing the value of one or more options across different strikes;
integrate market color data pertaining to options having a same underlying tenor into the anchor curve to generate a reference implied value curve; and
arbitrage-free optimize the reference implied value curve to generate an arbitrage-free curve.

23. The system at claim 22, wherein the at least one computing device is further configured to apply a smoothing functional utility (SFU) curve treatment to at least one of the anchor curve, the reference implied value curve and the arbitrage-free curve.

24. The system of claim 22, wherein the anchor curve comprises an implied volatility curve for non-spread options, and wherein the anchor curve comprises an implied correlation curve for spread options.

25. The system of claim 22, wherein the at least one computing device is further configured to:
applying one or more of an at-the-money (ATM) curve blending process, a third-party curve blending process, a reference product curve bending process, and an average price option (APO) curve shifting process to one or more historical settlement curves.

26. The system of claim 22, wherein the at least one computing device is further configured to:
generate an impact curve for each transformed strike point on the anchor curve having market color; and
blend one or more of the impact curves together to generate the reference implied value curve.

27. The system of claim 16, wherein the at least one computing device is further configured to:
define a search space based on a solution space and a valid space, said search space defining bounds for solutions to the objective function.

28. The system of claim 27, wherein the solution space comprises a null space or a range of solutions,
wherein the valid space defines a valid range for each of the two or more interrelated financial markets, said valid range being defined, in part, by a lower bound vector based on the lower bound price and an upper bound vector based on the upper bound price, and
wherein the intersection of the solution space and the valid space define said search space.

29. The system of claim 16, wherein the optimization model solves the objective function and provides an optimal pricing solution across each of the two or more interrelated financial markets within predetermined constraints.

30. The system of claim 16, wherein the at least one computing device comprises one or more of a desktop computer, a laptop computer, a server, a smartphone, a hand-held communication device, a tablet device, a kiosk, and a wired or wireless communications network, and
wherein said market color data comprises data relating to at least one of bids, offers, deals, orders, historic settlement prices, current market configurations, active market lists, third-party suggested settlement prices, execution venue deals, depth of market information, external settlement prices, third-party data, historical mutually dependent pricing relationships, and inter and intra-instrument no-arbitrage constraints.

* * * * *